United States Patent [19]

Kamitakahara et al.

[11] Patent Number: 5,759,455
[45] Date of Patent: Jun. 2, 1998

[54] ROLLER-SHAPED STAMPER FOR FABRICATING OPTICAL SCALES

[75] Inventors: Hirofumi Kamitakahara; Osamu Kanome, both of Yokohama, Japan

[73] Assignee: Canon Kabushiki Kaisha, Tokyo, Japan

[21] Appl. No.: 907,912

[22] Filed: Aug. 11, 1997

Related U.S. Application Data

[63] Continuation of Ser. No. 498,871, Jul. 6, 1995, abandoned.

[30] Foreign Application Priority Data

Jul. 8, 1994 [JP] Japan .................. 6-179758
Jul. 8, 1994 [JP] Japan .................. 6-179759

[51] Int. Cl.$^6$ .................................... B29D 11/00
[52] U.S. Cl. .............. 264/1.34; 264/1.6; 264/2.7; 425/327; 425/363; 425/812
[58] Field of Search .................. 425/327, 363, 425/385, 394, 403, 810, 812; 264/1.34, 1.6, 2.7

[56] References Cited

U.S. PATENT DOCUMENTS

| | | | |
|---|---|---|---|
| 4,496,300 | 1/1985 | Stransfeld | 425/812 |
| 5,267,228 | 11/1993 | Yashima et al. | 369/100 |
| 5,320,787 | 6/1994 | Hayashi et al. | 264/1.3 |
| 5,383,834 | 1/1995 | Kanome et al. | 492/25 |
| 5,433,897 | 7/1995 | Kanome et al. | 264/1.33 |

FOREIGN PATENT DOCUMENTS 62-3616  1/1987  Japan .

*Primary Examiner*—James P. Mackey
*Attorney, Agent, or Firm*—Fitzpatrick, Cella, Harper & Scinto

[57] ABSTRACT

A roller-shaped stamper has a scale portion with a light transmitting forming portion for forming the light transmitting portion on the resin, and a light shield forming portion for forming the light shielding portion of the resin, wherein the forming portions are alternately arranged with a constant pitch in a direction of rotation of said roller-shaped stamper; a plurality of scale portions are arranged in a direction normal to the direction of rotation of the roller-shaped stamper; and a groove disposed between the plural scale portions and extending in the direction of rotation of the roller-shaped stamper for exhausting air otherwise trapped between the resin and the roller-shaped stamper.

12 Claims, 30 Drawing Sheets

BEFORE MOLDING

DURING MOLDING 35.3 μm

ROLLER-SHAPED STAMPER FOR FABRICATING OPTICAL SCALES

This application is a continuation of application Ser. No. 08/498,871 filed Jul. 6, 1995, now abandoned.

BACKGROUND OF THE INVENTION

1. Field of the Invention

The present invention relates to an optical scale, and more particularly to a mold for forming an optical scale adapted for use in an optical encoder or the like and methods for producing said mold and for producing the optical scale with such mold.

2. Related Background Art

Optical encoders are widely employed in information equipment such as a printer, for detecting the position and speed of a movable part such as a carriage. Such an optical encoder is usually fixed on the movable part and is so constructed that the optical scale bearing optical codes is irradiated with light and thus modulated light is photoelectrically converted to provide an encoded electrical signal indicating the information on the position of the movable part.

Such an optical scale is composed of:

(1) a metal plate in which slits are formed by etching;
(2) a transparent substrate such as glass or plastic, depositing thereon a vapored metal layer such as silver, copper, chromium or aluminum, in which slits are formed only in the metal layer by etching; or
(3) a silver halide-based photographic film patterned by exposure to a photomask, obtained by forming a slit pattern with photoresist on a mask blank and eliminating the slit portions by etching, followed by a developing process.

However, in the optical scale (1) mentioned above, fine codes are difficult to record since the minimum etchable slit width is limited to twice the thickness of the metal layer. On the other hand, other optical scales are expensive since the manufacturing processes are complex and the etching requires expensive photosensitive resin.

Also the optical scale utilizing the silver salt photographic film is expensive as such film itself is costly.

Thus, Igaki et al. discloses an optical scale of the structure as shown in the Japanese Patent Laid-open Application No. 62-3616, which can be produced inexpensively by injection molding or compression molding. In incorporating such an optical encoder in a printer, for detecting the position and speed of the movable part such as the carriage, such optical scale has to have a length of at least 210 mm, corresponding to the shorter side of A4 size sheet, and usually has a width of 3 to 15 mm. Such oblong scale, if produced by injection molding, is associated with poor productivity, since the thickness has to be made large and the production has to be made piece by piece. On the other hand, the compression molding allows to form plural pieces on a mold, but the productivity is still poor because of a long pressing time and the separate sheet process.

As explained in the foregoing, the conventional optical scales are expensive in any producing method and are therefore unsuitable for use in the inexpensive general-purpose printers.

Thus the investigation for an inexpensive producing method for the optical scale with a high productivity has led to the roller grooving (RG) method of the present invention.

More specifically, it has been found that drastic cost reduction is possible by a method for producing an optical scale provided in a part of a translucent member with a mark area in which translucent portions and non-translucent portions, consisting of inclined faces having an incident angle at least equal to the critical angle to the incident light, are alternately formed, comprising:

1. a first step of mounting a mold, larger than the corresponding pattern of the desired optical scale, on a roller thereby forming a roller-shaped stamper;
2. a second step of melting thermoplastic resin, having a light transmittance of at least 50% at the wavelength to be used, in an extruder and extruding said resin from a T die; and
3. a third step of pinching the molten resin between the roller-shaped stamper and a mirror-faced roller thereby forming a sheet and simultaneously transferring the pattern of the optical scale, thereby producing a sheet-shaped optical scale with a thickness of 0.1 to 1.0 mm.

For example, in the case of producing a thin plate-shaped article, the conventional compression molding method involves a heating step and a cooling step in a cycle, thus requiring at least about 3 minutes for a cycle. Therefore, even if 60 scale patterns are formed on a mold, there can be produced only 20 pieces per minute.

On the other hand, in the above-mentioned RG method, even if only 15 scale patterns are formed on a mold, two molds can be mounted on a roller, and the molding can be conducted as fast as 1–7 m/min. Consequently there can be produced 30 to 210 pieces per minute, corresponding to 1.5 to 10.5 times as much as the production rate in the compression molding method. Also the RG method provides an advantage of a longer service life of the mold, as it requires a lower molding pressure than in the compression molding method, since the molding is conducted while the resin is in the molten state.

Though the RG method can provide molded products of a low cost owing to the very high productivity and the long service life of the mold, there are required various measures for lowering the defect rate of the molded products and further reducing the cost. For this purpose it is necessary to analyze the factors affecting the cost and to eliminate the factors leading to the cost increase.

In producing the above-mentioned optical scales with this method, the factors most affecting the cost are the amortization derived from the cost of the molding apparatus and the defect rate of the molded products. For reducing the cost of the molding apparatus, a compacter apparatus with a narrower roller is employed. A smaller apparatus is more amenable to improving precision, and is advantageous also in the space of installation, ease of handling, safety and cost reduction in the accessory equipment.

On the other hand, in case of producing an oblong optical scale with a narrow apparatus, the grooves of the scale are aligned perpendicularly to the direction of molding, and it has been revealed that the molding operation in such situation causes air involvement at the pinching of the resin in the recessed portion of the mold, whereby a bubble defect is formed and raises the defect rate.

Consequently the prevention of such bubble defect has been a technical issue for producing inexpensive optical scales of a high quality with a narrow apparatus.

SUMMARY OF THE INVENTION

The present invention, attained for overcoming the drawbacks in the above-explained prior technologies, provides an optical scale forming mold capable of producing an oblong optical scale with satisfactory precision and with a low cost by extrusion molding, and a method for producing an optical scale with the above-mentioned mold.

The above-mentioned object can be attained, according to an aspect of the present invention, by a mold for forming translucent areas and light shielding areas on a thermoplastic synthetic resin sheet by extrusion molding thereby producing an optical scale, comprising:

a scale forming portion including translucent area forming portions for forming translucent areas and light shielding area forming portions for forming light shielding areas, said translucent area forming portions and said light shielding area forming portions are alternately arranged with a constant pitch; and an air ejecting mechanism portion for ejecting the air present between said thermoplastic synthetic resin and said mold prior to the molding operation.

In a preferred embodiment, said air ejecting mechanism portion includes a continuous groove parallel to the extruding direction of said sheet.

Also in a preferred embodiment, said air ejecting mechanism portion includes a groove provided on the boundary between said translucent area forming portion and said light shielding area forming portion.

Also in a preferred embodiment, said air ejecting mechanism portion includes a subbing layer formed on the rear face of said scale forming portion, so as to deform said scale forming portion into a convex shape.

Also in a preferred embodiment, said air ejecting mechanism portion includes a mechanism for arranging said translucent area forming portions and said light shielding area forming portions obliquely with respect to the extruding direction of said sheet.

Also in a preferred embodiment, said air ejecting mechanism portion includes a groove of which an inclined face is set equal to the critical angle or more, in said light shielding area forming portion.

Also in a preferred embodiment, said air ejecting mechanism portion includes said translucent area forming portion of a flat-faced structure and said light shielding area forming portion of a prism-faced structure.

Also said flat-faced or prism-faced preferred structure includes a curved surface.

Also in a preferred embodiment, said translucent area forming portion includes a concavely curved surface.

Also in a preferred embodiment, said light shielding area has a tetragonal conical shape.

In a preferred embodiment, said air ejecting mechanism portion includes said translucent area forming portion of a convexly curved face and said light shielding area forming portion of which inclined angle in the extruding direction of said sheet does not exceed 45°.

Also in a preferred embodiment, said air ejecting mechanism portion includes said translucent area forming portion and said light shielding area forming portion, both formed with convexly curved surfaces.

Also in a preferred embodiment, said scale forming portions, positioned side by side across a sliding face forming portion, are so arranged that said translucent area forming portions and said light shielding area forming portions are aberrated, by an odd multiple of the pitch of said portions, mutually between said scale forming portions.

Also in a preferred embodiment, said air ejecting mechanism portion includes said translucent area forming portion consisting of a mirror finish surface and said light shielding area forming portion consisting of a coarse surface.

Also in a preferred embodiment, said coarse surface portion and said mirror finish surface portion have a step difference in height, wherein the former is higher than the latter.

Also in a preferred embodiment, said translucent area forming portion and said light shielding area forming portion have a step difference in height, wherein the latter is higher than the former.

Also in a preferred embodiment, said mold is formed as a roller-shaped stamper.

Also in an aspect of the present invention, there is provided a method for producing a mold for producing an optical scale by forming translucent areas and light shielding areas on a thermoplastic synthetic resin sheet by extrusion molding, comprising steps of:

forming, on a phosphor bronze substrate, a sliding face forming portion and then forming, on said phosphor bronze substrate, translucent area forming portions of a flat-faced structure and light shielding area forming portions of a prism-faced structure;

forming a hard film on a surface bearing said sliding face forming portion, said translucent area forming portions and said light shielding area forming portions;

dropping ultraviolet-curable resin on the surface bearing said hard film, then placing a glass substrate thereon and effecting ultraviolet irradiation, thereby forming a glass mother plate;

forming an electrically conductive film on said glass mother plate;

forming a metal film on said glass mother plate bearing said conductive film thereon;

polishing thus formed metal film; and peeling the conductive film and the metal film integrally from the glass mother plate.

Also in an aspect of the present invention, there is provided a method for producing a mold for producing an optical scale by forming translucent areas and light shielding areas on a thermoplastic synthetic resin sheet by extrusion molding, said mold bearing said translucent area forming portions of a mirror finish surface and said light shielding area forming portions of a coarse surface, comprising steps of:

maintaining a mask member, in which the pattern of the optical scale is patterned, in close contact with a glass substrate, and sand blasting said glass substrate to form a glass mother plate;

forming an electrically conductive film on said glass mother plate;

forming a metal film on the glass mother plate bearing said conductive film;

polishing thus formed metal film; and peeling said conductive film and said metal film integrally from the glass mother plate.

Also in another aspect of the present invention, there is provided a method for producing a mold for producing an optical scale by forming translucent areas and light shielding areas on a thermoplastic synthetic resin sheet by extrusion molding, said mold bearing said translucent area forming portions of a mirror finish surface and said light shielding area forming portions of a coarse surface, comprising steps of:

forming, with photoresist, the pattern of the optical scale on a metal plate with a coarse surface; and dropping ultraviolet-curable resin on thus patterned metal plate and effecting ultraviolet irradiation.

Also in another aspect of the present invention, there is provided a method for producing a mold for producing an optical scale by forming translucent areas and light shielding areas on a thermoplastic synthetic resin sheet by extrusion molding, said mold bearing said translucent area forming portions of a mirror finish surface and said light shielding area forming portions of a coarse surface, comprising steps of:

forming, with photoresist, the pattern of the optical scale on a metal plate with a mirror finish surface; and effecting inverse sputtering of thus patterned metal plate.

In an aspect of the present invention, there is provided an optical scale comprising:

translucent areas of a flat-faced structure; and light shielding areas of a prism-faced structure.

In a preferred embodiment, said flat-faced structure or said prism-faced structure includes a curved surface.

Also in a preferred embodiment, said translucent area includes a convexly curved surface.

Also in a preferred embodiment, said light shielding area has a tetragonal conical shape.

Also in a preferred embodiment, said translucent area and said light shielding area have a step difference in height, wherein the latter is higher than the former.

In another aspect of the present invention, there is provided an optical scale comprising:

translucent areas of a mirror finish surface; and light shielding areas of a coarse surface.

In a preferred embodiment, said coarse surface area and said mirror surface area have a step difference in height, wherein the former is higher than the latter.

Also in a preferred embodiment, ink is formed on said coarse surface area.

In an aspect of the present invention, there is provided a method for producing an optical scale, comprising steps of:

forming, on a roller-shaped mold provided on the periphery thereof with a scale forming portion including translucent area forming portions for forming translucent areas and light shielding area forming portions for forming light shielding areas, wherein said translucent area forming portions and said light shielding area forming portions are alternately arranged with a constant pitch, an air ejecting mechanism portion for ejecting air present between thermoplastic synthetic resin and said mold at the molding operation;

rotating, at a desired speed, a roller provided in opposed relationship to said roller-shaped mold and supplying thermoplastic resin, heated to a predetermined temperature, from an extruding device therefor to the gap between said roller-shaped mold and said roller; and pinching said thermoplastic resin between said roller-shaped mold and said roller thereby transferring the pattern of said scale forming portion.

In a preferred embodiment, said air ejecting mechanism portion includes a continuous groove parallel to the extruding direction of said thermoplastic resin.

Also in a preferred embodiment, said air ejecting mechanism portion includes a groove provided on the boundary between said translucent area forming portion and said light shielding area forming portion.

Also in a preferred embodiment, said air ejecting mechanism portion includes a subbing layer formed on the rear face of said scale forming portion, so as to deform said scale forming portion into a convex shape.

Also in a preferred embodiment, said air ejecting mechanism portion includes a mechanism for arranging said translucent area forming portions and said light shielding area forming portions obliquely with respect to the extruding direction of said thermoplastic resin.

Also in a preferred embodiment, said air ejecting mechanism portion includes a groove of which an inclined face is set at least equal to the critical angle, in said light shielding area forming portion.

Also in a preferred embodiment, said air ejecting mechanism portion includes said translucent area forming portion of a flat-faced structure and said light shielding area forming portion of a prism-faced structure.

Also said flat-faced or prism-faced preferred structure includes a curved surface.

Also in a preferred embodiment, said translucent area forming portion includes a concavely curved surface.

Also in a preferred embodiment, said light shielding area has a tetragonal conical shape.

Also in a preferred embodiment, said air ejecting mechanism portion includes said translucent area forming portion of a convexly curved surface and said light shielding area forming portion of which inclined angle in the extruding direction of said thermoplastic resin does not exceed 45°.

Also in a preferred embodiment, said air ejecting mechanism portion includes said translucent area forming portion and said light shielding area forming portion, both formed with convexly curved surfaces.

Also in a preferred embodiment, said scale forming portions, positioned side by side across a sliding face forming portion, are so arranged that said translucent area forming portions and said light shielding area forming portions are aberrated, by an odd multiple of a half of the pitch of said portions, mutually between said scale forming portions.

Also in a preferred embodiment, said air ejecting mechanism portion includes said translucent area forming portion consisting of a mirror finish surface and said light shielding area forming portion consisting of a coarse surface.

Also in a preferred embodiment, said coarse surface area and said mirror finish surface area have a step difference in height, wherein the former is higher than the latter.

Also in a preferred embodiment, said translucent area forming portion and said light shielding area forming portion have a step difference in height, wherein the latter is higher than the former.

BRIEF DESCRIPTION OF THE DRAWINGS

FIG. 17A is a schematic cross-sectional view of a state when molten resin is pinched between a mirror finish roller and a conventional stamper without the air ejecting mechanism, while

DETAILED DESCRIPTION OF THE PREFERRED EMBODIMENTS

Now the present invention will be explained in greater details with reference to the attached drawings.

Figure 1:
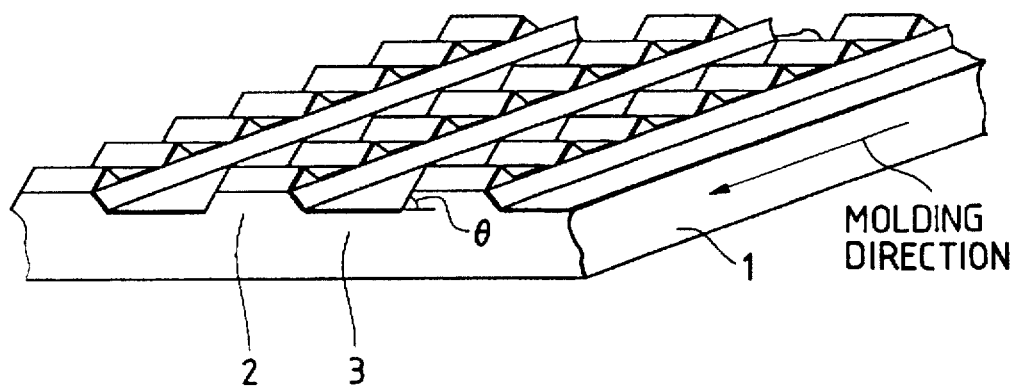
FIG. 1 is a schematic perspective view of an embodiment of the optical scale forming mold of the present invention.

According to the present invention, the mechanism for ejecting air from the optical scale forming mold is composed, for example as shown in FIG. 1, in a mold 1 in which the longitudinal direction of a scale forming portion 2 coincides with the molding direction (indicated by an arrow), of a continuous air ejecting groove 3, formed between the adjacent scale forming portions 2 and parallel to the moving direction of the molding sheet.

The depth of the air ejecting groove 3 is within a range from 5 to 100 μm, preferably from 10 to 80 μm, as an excessively shallow groove cannot achieve sufficient air ejection while an excessively deep groove results in defective release of the molded article.

Also the width of the air ejecting groove is within a range from 0.1 to 10 mm, preferably from 0.3 to 8 mm, as an excessively narrow groove cannot achieve sufficient prevention of air bubble formation while an excessively wide groove increases the unnecessary portion in the molded article, thus raising the cost of the optical scale.

Figure 2:
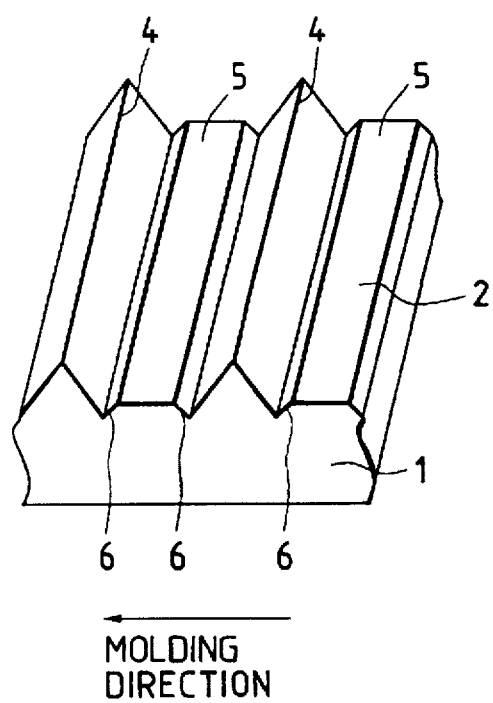
FIG. 2 is a schematic perspective view of another embodiment of the optical scale forming mold of the present invention.

Another air ejecting mechanism of the present invention for preventing bubble defect formation is composed, as shown in FIG. 2, of an air ejecting groove 6 formed at the boundary between a light shield area forming portion 4 and a translucent area forming portion 5 in a scale forming portion 2 of a mold 1. In such configuration, the inclined face of the air ejecting groove 6 is preferably so inclined as to have at least the critical angle to the incident light.

Figure 3A:
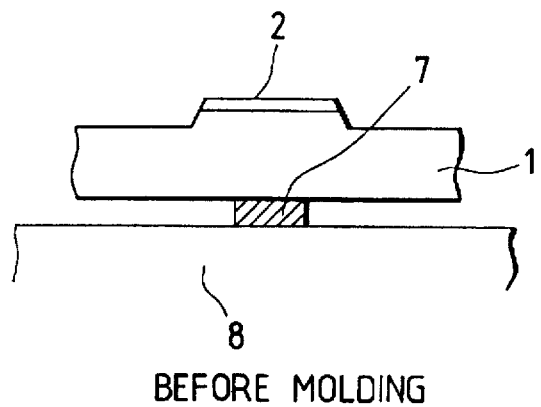
FIGS. 3A and 3B are schematic cross-sectional views of another embodiment of the optical scale forming mold of the present invention.
Figure 3B:
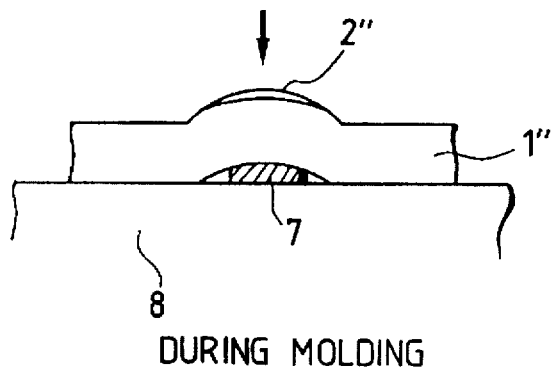

Also in case the scale forming mold is 0.3 mm thick or less, the molding operation can be conducted, as shown in FIG. 3A, with a thick subbing layer 7 under the scale forming portion 2, whereby the scale forming portion 2 of the mold 1 is deformed in an arched form by the molding pressure of the resin as shown in FIG. 3B, and the bubble defect can thus be prevented. In such case the subbing layer 7 is preferably positioned at the center of the scale forming portion 2, but it may be displaced to the right or to the left as long as the height of the scale forming portion 2 can vary in continuous manner.

Figure 4:
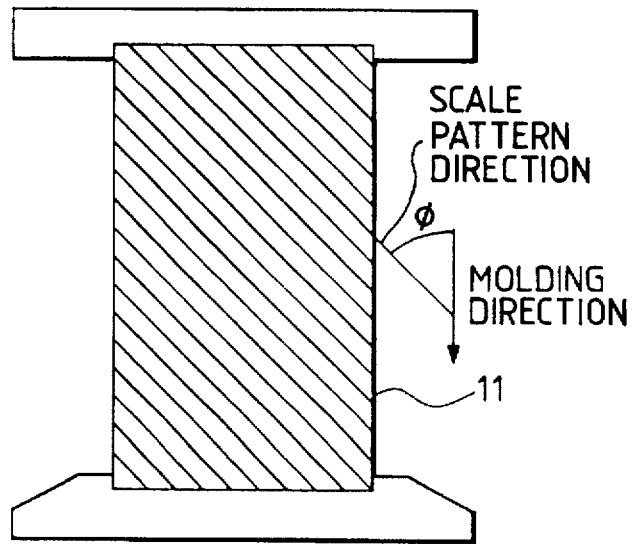
FIG. 4 is a schematic view of another embodiment of the optical scale forming mold of the present invention.

Also for air ejection, the groove of the translucent area of the light shield area of the optical scale pattern may be utilized as an air ejecting groove, by forming a mold 11 as shown in FIG. 4, in which the direction of the scale pattern (direction of translucent or light shield area) is inclined, by an angle φ, to the molding direction. The angle φ is preferably within a range from 25° to 80°, as an angle close to 90° cannot provide sufficient effect for bubble defect prevention, while an angle close to 0° increases the sensitivity of the scale along the shorter side thereof, thus deteriorating the performance of the optical scale.

FIG. 4 shows an arrangement in which the pattern is formed over the entire surface of the mold 11, but the pattern may be divided by air ejecting grooves parallel to the molding direction as shown in FIG. 1, for further increasing the prevention of the bubble defect.

Figure 5:
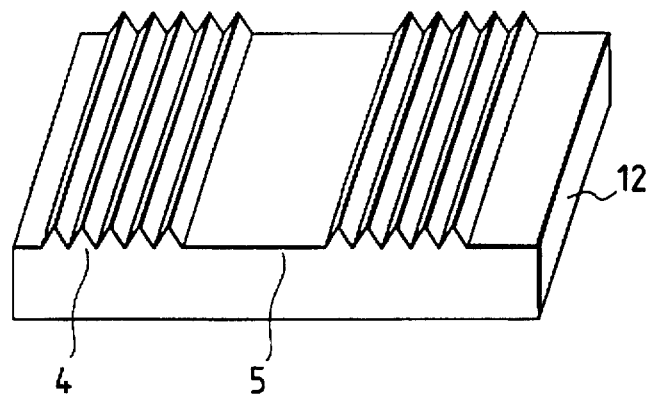
FIG. 5 is a schematic perspective view of another embodiment of the optical scale forming mold of the present invention.

The bubble defect can also be prevented, as shown in FIG. 5, by dividing the light shield area 4 of the scale forming portion 12 into two or more streaks and forming air ejecting grooves therebetween. In such configuration, the depth of each groove (height of each peak) is selected as 10 μm or less, preferably 6 μm, and a large number of the grooves can provide a stronger effect for bubble defect prevention.

Figure 14:
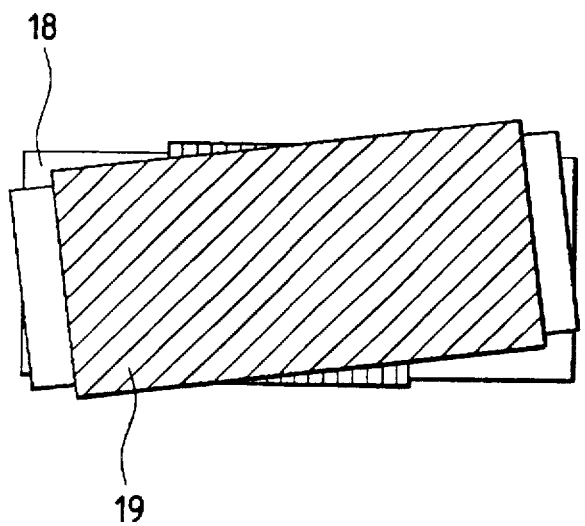
FIG. 14 is a schematic view of an example of roller arrangement in the preparation of the optical scale with a roller-shaped mold bearing the optical scale forming mold of the present invention.

The bubble defect preventing effect can be further enhanced by the molding operation with an apparatus in which, as shown in FIG. 14, the rotating axis of a molding roller 19, covered with heat-resistant resin such as silicone rubber or fluorinated resin, is inclined to the rotating axis of a roller-shaped mold 18 by an angle not exceeding 30°.

For producing the optical scale forming mold of the present invention, there is advantageously employed a method of preparing a master mold of a predetermined scale shape by cutting a metal plate, then forming a replica with a resinous material, rendering the surface of the replica conductive, and effecting electroplating, polishing, trimming and welding of a support member thereby forming a work stamper. However, the predetermined scale shape may be formed by direct cutting of a thin metal plate of a uniform thickness.

Figure 11:
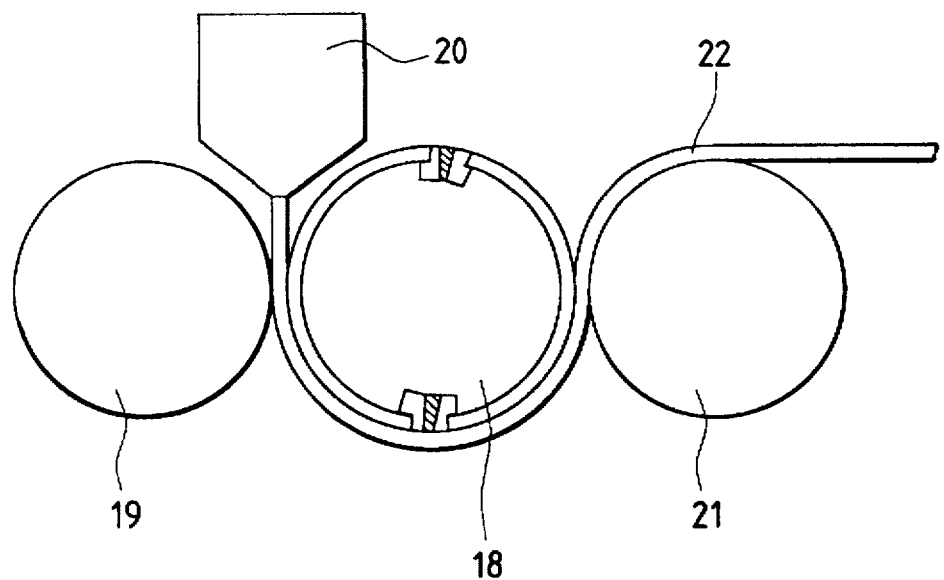
FIG. 11 is a schematic view showing a continuous producing method of the optical scales with the roller-shaped mold bearing the optical scale forming mold of the present invention.

Also the optical scale producing method of the present invention is a method for continuously producing optical scales by extrusion molding in which, as shown in FIG. 11, a molding roller 19 is positioned opposite to a roller-shaped mold 18, having a scale pattern on the periphery thereof and provided further with an air ejecting mechanism, and thermoplastic resin heated to a predetermined temperature is extruded from a T die 20 to the gap between the roller-shaped mold 18 and the molding roller 19 while both rollers are rotated at a desired speed, whereby the resin is pinched therebetween to effect transfer of the scale pattern and is then passed between the roller-shaped mold 18 and a conveyor roller 21 to provide an optical scale sheet 22.

The thermoplastic resin employed for the preparation of the optical scale of the present invention is required to have an optical transmittance of at least 50% at the wavelength of the light to be used, but the resin with a transmittance of 70% or higher is advantageously employed in consideration of the efficiency of light utilization. Among such resins, there are advantageously employed, also in consideration of the mechanical strength and the optical properties, polyimide resin, polysulfone resin, polyetheretherketone resin, polycarbonate resin, amorphous polyolefin resin, acrylic resin, styrol resin, PET, ABS and vinylic resin.

In the present invention, the roller-shaped mold and the opposing molding roller is preferably composed of a material of a high hardness and a high thermal conductivity, allowing easy mirror finish of the peripheral surface. Examples of such material include iron, steel, chromium steel, aluminum, aluminum alloys, mold steel, phosphor bronze and stainless steel.

Figure 16A:
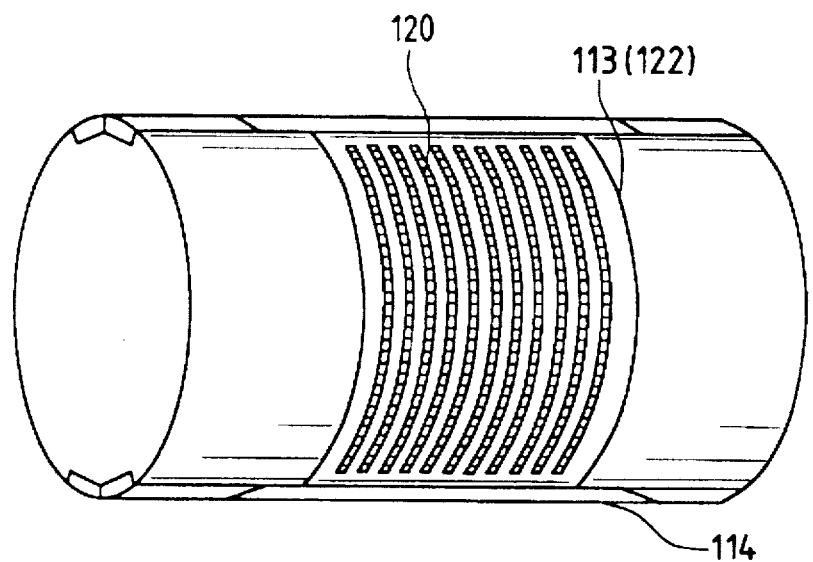
FIG. 16A is a perspective view of a roller-shaped stamper in which the translucent area forming portions and the light shielding area forming portions are formed parallel to the molding direction.
Figure 16B:
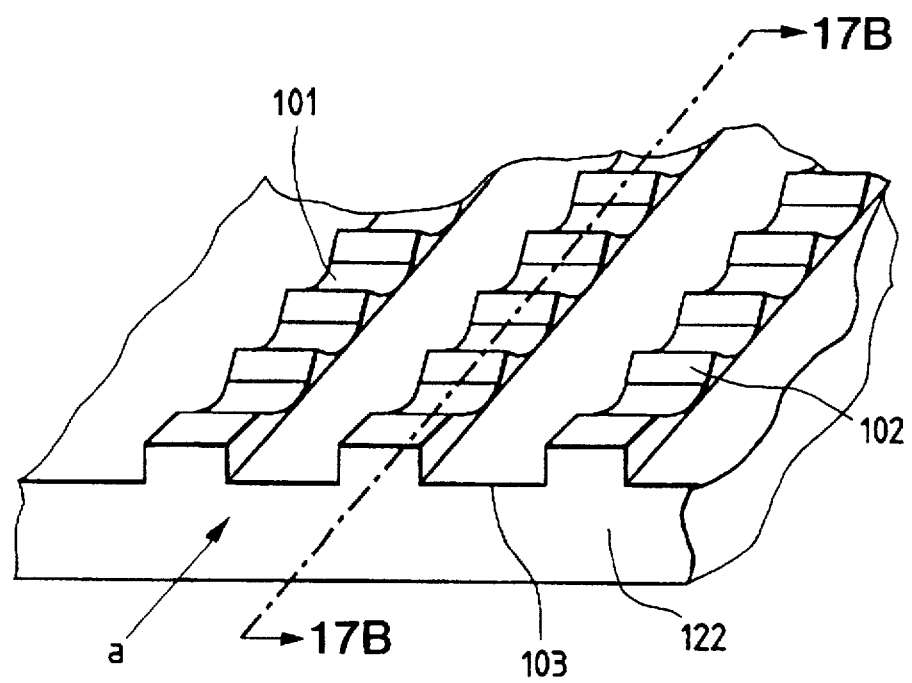
FIG. 16B is a schematic view of the pattern corresponding to a flexible stamper of an embodiment 1, provided with an air ejecting mechanism of the present invention.

FIG. 16B is a schematic view of a pattern, corresponding to the optical scale, of a flexible stamper of an embodiment 7, provided with an air ejecting mechanism of the present invention, wherein shown are a portion 101 for forming a translucent area of the optical scale; a portion 102 for forming a light shield area of the optical scale; a portion 103 for forming a sliding face for a sub scale; and a stamper 122 provided with the air ejecting mechanism. FIG. 16A is a perspective view of a roller-shaped stamper in which the translucent area forming portions and the light shield area forming portions are arranged parallel to the molding direction, wherein illustrated are the flexible stamper 113 of the present invention; patterns 120 formed on the flexible stamper corresponding to the optical scale; and a roller-shaped stamper 114 formed by fixing the flexible stamper on a roller.

Figure 17A:
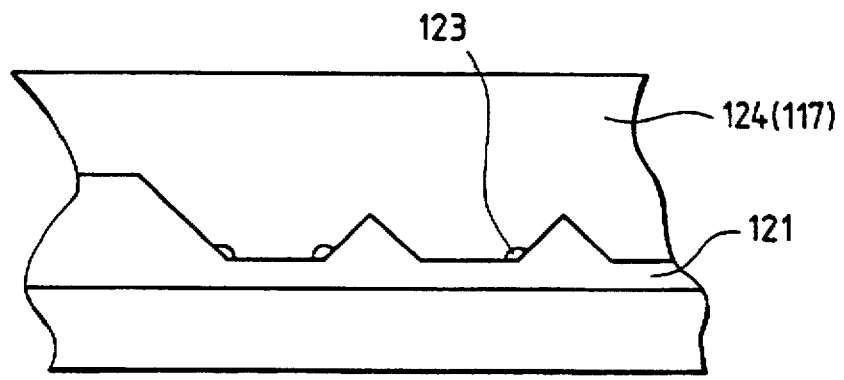
Figure 17B:
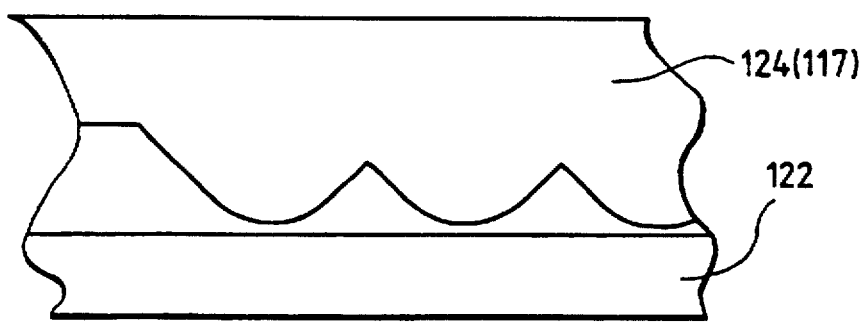
FIG. 17B is a schematic cross-sectional view of a state when molten resin is pinched between a mirror finish roller and a stamper of the present invention, having a curved surface in the translucent area forming portion.

FIG. 17B is a schematic cross-sectional view along a line 17B—17B in FIG. 16B, in a state when molten resin 124 is pinched between a mirror surfaced roller and a stamper of the present invention having a curved surface in the translucent area forming portion.

Figure 18:
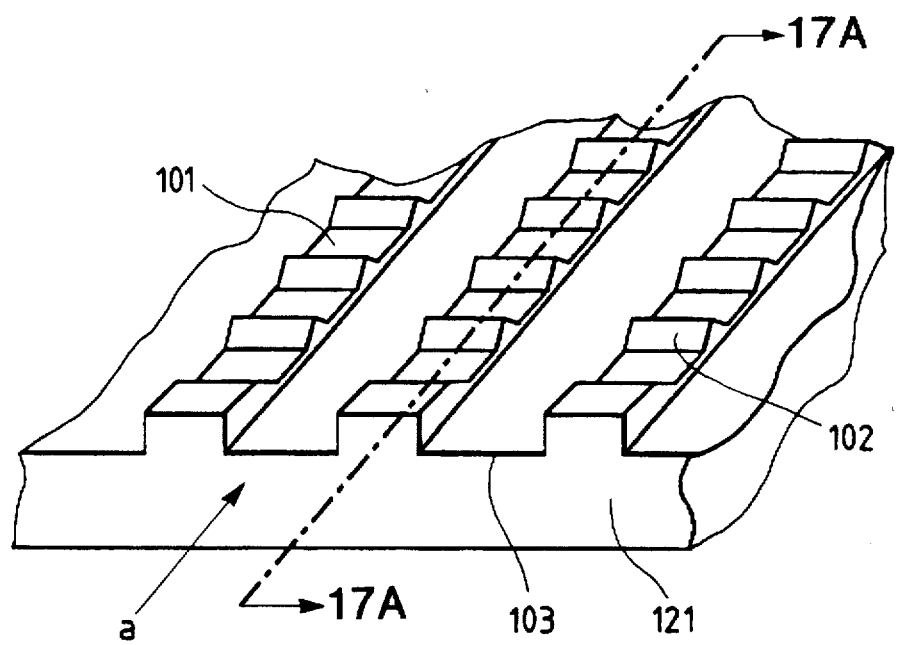
FIG. 18 is a perspective view of a stamper without the air ejecting mechanism.

FIG. 17A is a schematic cross-sectional view along a line 17A—17A in FIG. 18, in a state when molten resin is pinched between a mirror surfaced roller and a conventional stamper without the air ejecting mechanism, wherein shown are bubble defects 123 formed at the boundary between the translucent area and the light shield area of the optical scale.

Figure 25A:
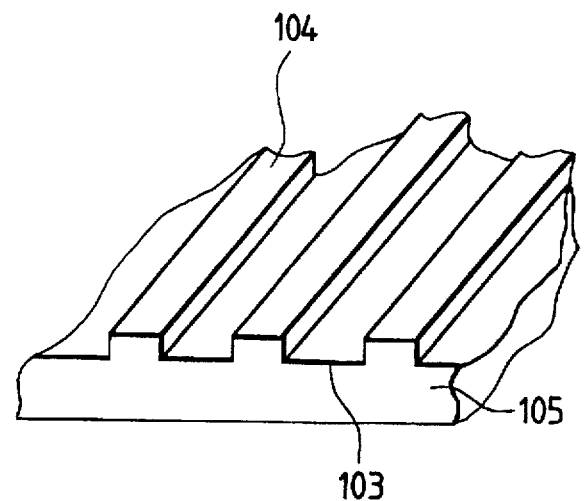
FIGS. 25A to 25C are views showing steps of a method for producing the phosphor bronze master plate.
Figure 25B:
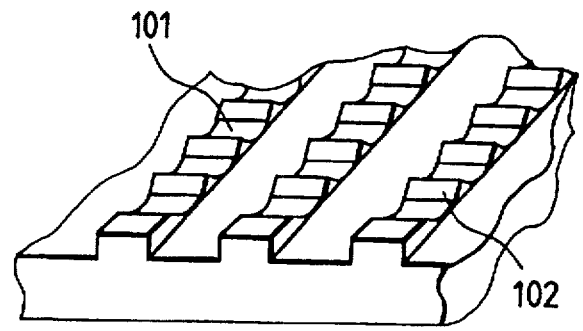
Figure 25C:
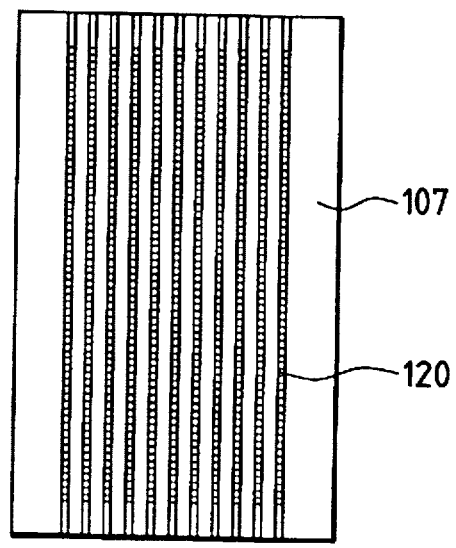

FIGS. 25A to 25C are views of steps of a method for producing a phosphor bronze master plate, wherein shown are a phosphor bronze substrate 105 with a mirror finished surface; a sliding face forming portion 103 formed with a sintered diamond bite; a portion 104, where a pattern corresponding to the optical scale is to be formed, obtained by forming the sliding face forming portion on the mirror finished phosphor bronze substrate; a pattern 120, corresponding to the optical scale, formed by cutting with a monocrystalline diamond bite; and a phosphor bronze master plate 107 bearing the pattern, corresponding to the optical scale, on the mirror finished surface of the phosphor bronze substrate.

FIGS. 26A to 26F are views of steps of a method for producing a flexible stamper of the present invention, wherein shown are a phosphor bronze master plate 107 bearing a pattern, corresponding to the optical scale, on a mirror finished surface of a phosphor bronze substrate; ultraviolet curable resin 108 for transferring the pattern, corresponding to the optical scale, from the phosphor bronze master plate; a glass substrate 110 for producing a glass master plate; a glass master plate 111 obtained by forming a scale pattern on the glass substrate; a conductive film 109 provided on the glass master plate for forming a metal film thereon; a metal film 112 formed by electroplating on the glass master plate bearing the conductive film; and a flexible stamper 113 formed by polishing the metal film to a predetermined thickness and peeling the conductive film and the metal film integrally from the glass master plate.

Figure 27:
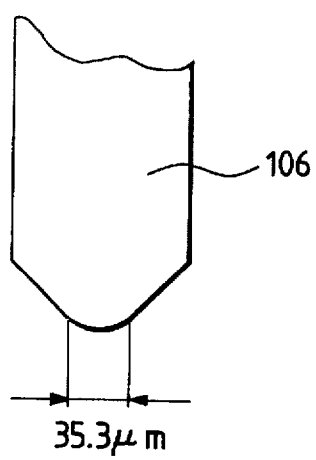
FIGS. 27 to 29 are schematic views showing shapes of a monocrystalline diamond bite.

FIG. 27 is a schematic view showing the shape of the monocrystalline diamond bite, wherein shown is a monocrystalline diamond bite A employed in the preparation of the stamper of the present invention, having a curved surface in the translucent area forming portion.

Figure 24:
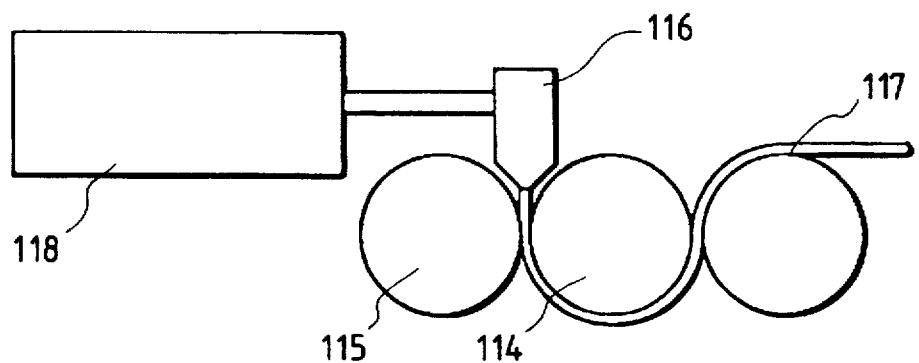
FIG. 24 is a schematic cross-sectional view of a roller grooving apparatus.

FIG. 24 is a schematic cross-sectional view of a roller grooving (RG) apparatus, wherein shown are an extruder 118 for melting pellets of resin such as polycarbonate and extruding said resin with a constant speed; a T-die 116 for preforming the molten resin, supplied from the extruder, approximately to a desired form; a roller-shaped stamper 114 for transferring the fine patterns of the translucent areas, light shield areas, sliding face etc. onto the molten resin extruded from the T-die; a mirror-finished roller 115 for adjusting the thickness and the mirror finished surface of the optical scale; and a continuous sheet 117 of the optical scales, obtained by passing the molten resin, extruded from the T-die of the extruder, between the roller-shaped stamper and the mirror finish roller and transferring the pattern of the roller-shaped stamper under a suitable molding pressure.

Figure 28:
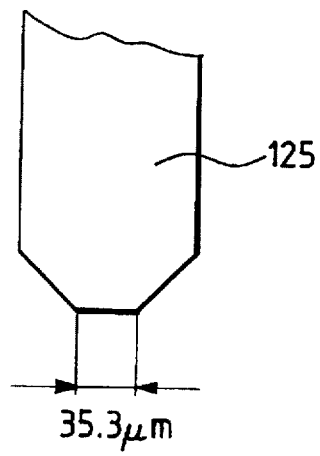

FIG. 28 is a schematic view showing the shape of a monocrystalline diamond bite B 25, employed in the preparation of a stamper without the air ejecting mechanism.

FIG. 18 is a perspective view of a stamper 121 without the air ejecting mechanism, of which schematic cross section along a line 17A—17A is shown in FIG. 17A.

Figure 23:
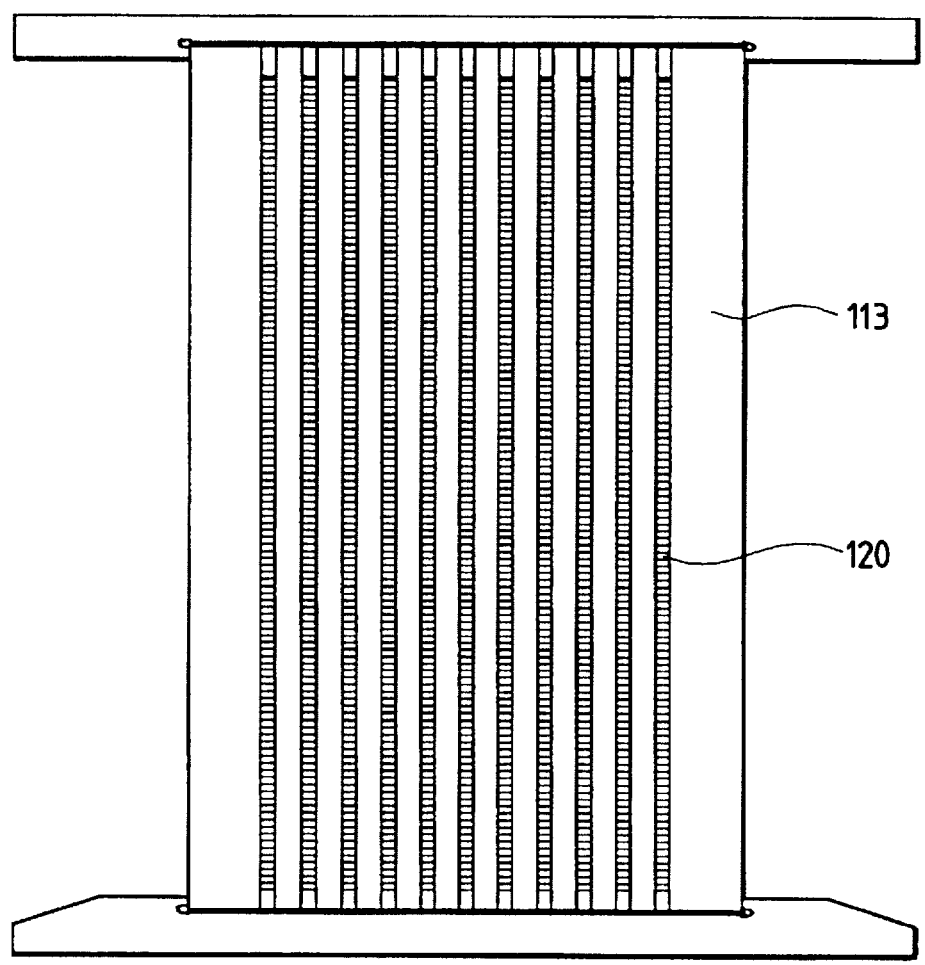
FIG. 23 is a schematic view of a flexible stamper in which the translucent area forming portions and the light shielding area forming portions are formed parallel to the molding direction.

FIG. 23 illustrates a flexible stamper in which the translucent area forming portions and the light shield area forming portions are provided parallel to the molding direction.

Figure 19A:
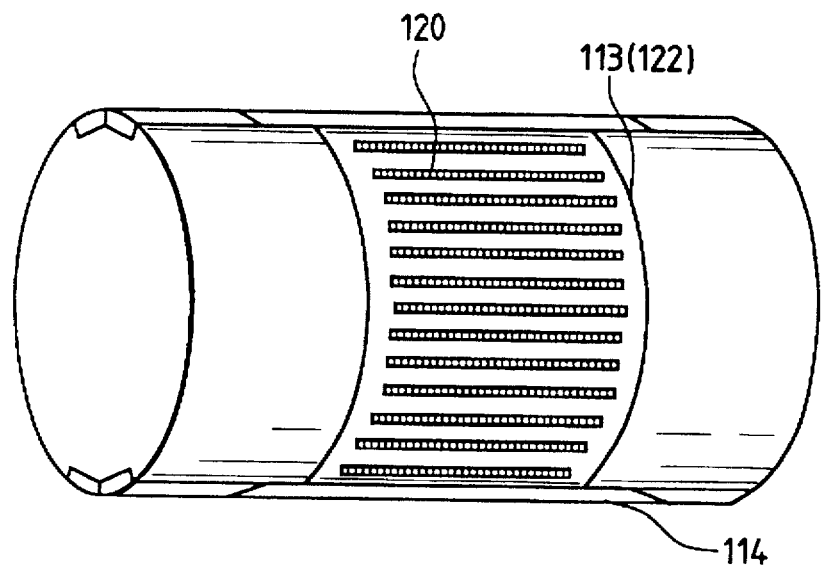
FIGS. 19A and 19B are schematic views of a pattern, corresponding to the optical scale of the flexible stamper of an embodiment 8, provided with the air ejecting mechanism of the present invention.
Figure 19B:
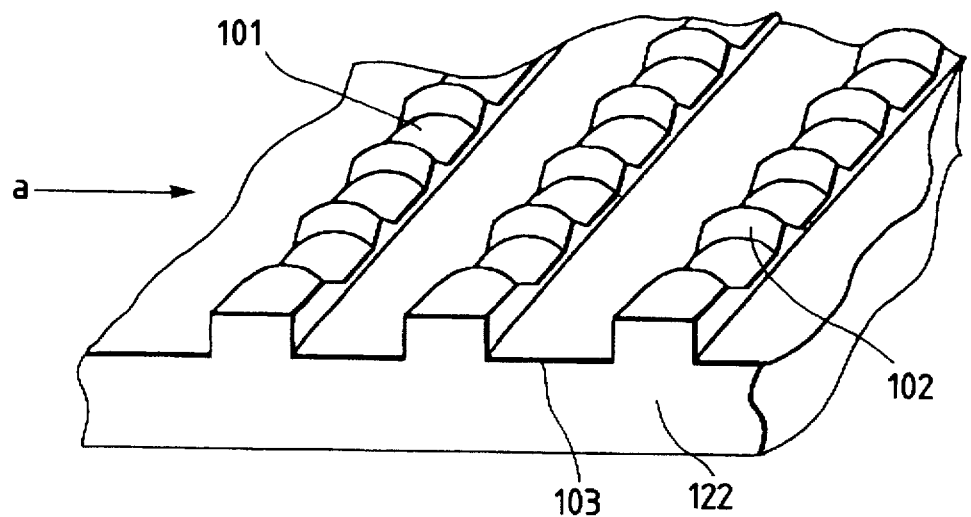

FIGS. 19A and 19B are schematic views of a pattern, corresponding to the optical scale, of a flexible stamper of an embodiment 8 with the air ejecting mechanism of the present invention, wherein shown is a roller-shaped stamper 114 in which the translucent area forming portions and the light shield area forming portions are arranged perpendicularly to the molding direction.

Figure 22A:
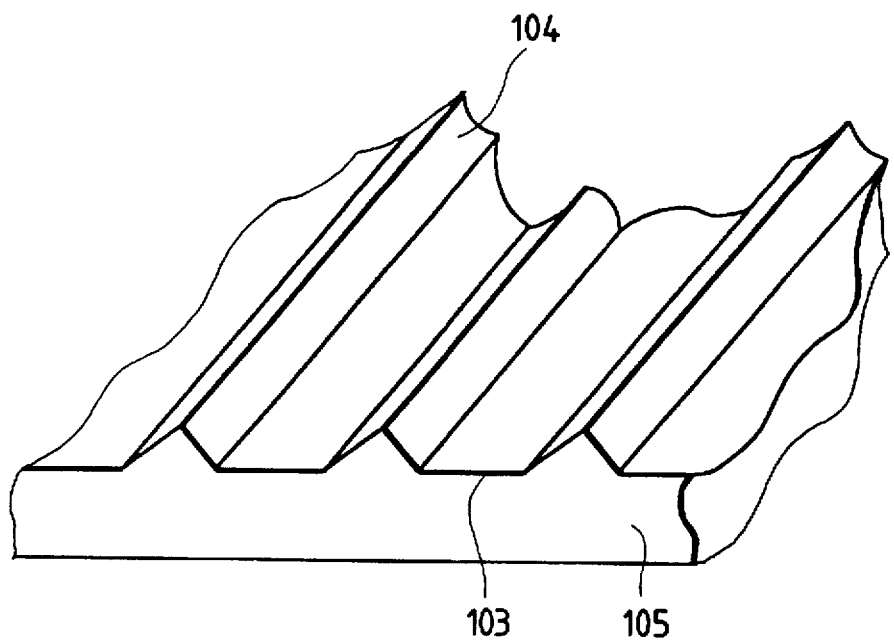
FIGS. 22A and 22B are schematic views of a phosphor bronze substrate for producing a flexible stamper of an embodiment 9, provided with the air ejecting mechanism of the present invention, wherein the light shielding area forming portion has a tetragonal conical shape.
Figure 22B:
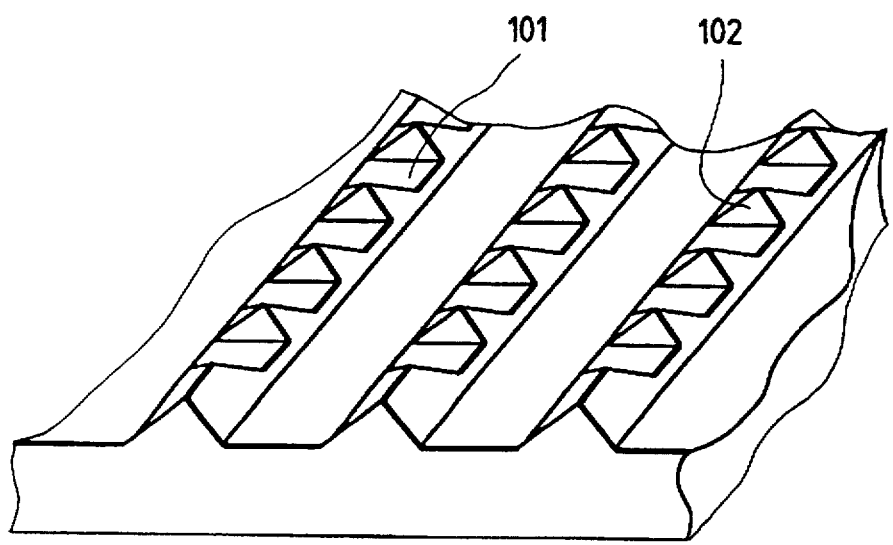

FIGS. 22A and 22B are schematic views of a phosphor bronze master plate for producing a flexible stamper of an embodiment 9 of the present invention, with an air ejecting mechanism, wherein the light shield area forming portion has a tetragonal conical shape.

Figure 29:
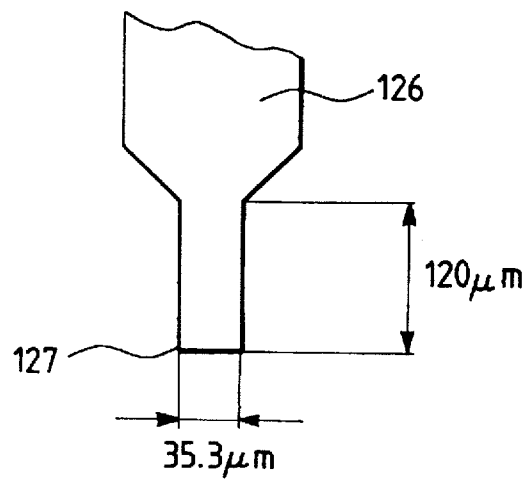

FIG. 29 is a schematic view showing the shape of a monocrystalline diamond bite C 126 employed in the preparation of a stamper of an embodiment 9, without the air ejecting mechanism, wherein an edge 127 may also be rounded.

Figure 20:
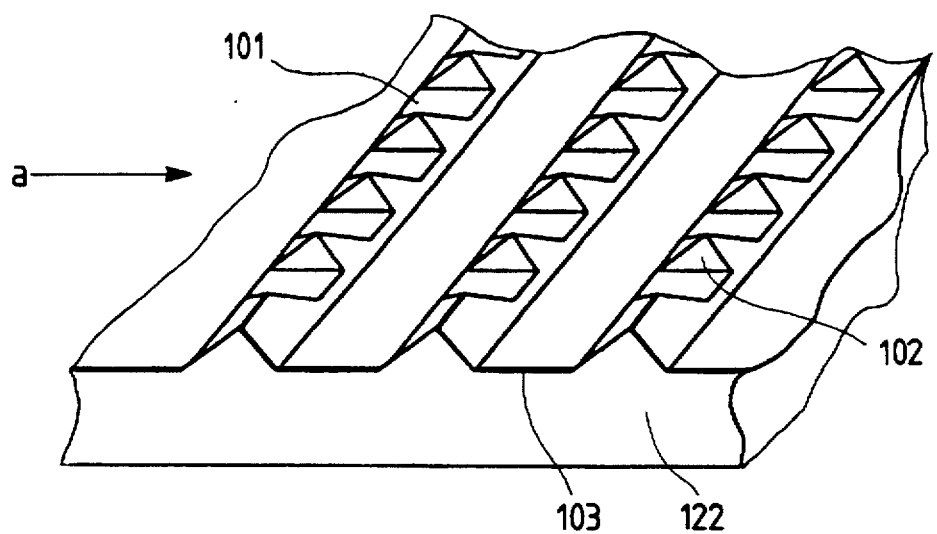
FIG. 20 is a schematic view of a pattern, corresponding to the optical scale, of a flexible stamper provided with the air ejecting mechanism, wherein the light shielding area forming portion has a tetragonal conical shape.

FIG. 20 is a schematic view of a pattern, corresponding to the optical scale, of a flexible stamper provided with an air ejecting mechanism, wherein the light shield area forming portion has a tetragonal conical shape.

Figure 21:
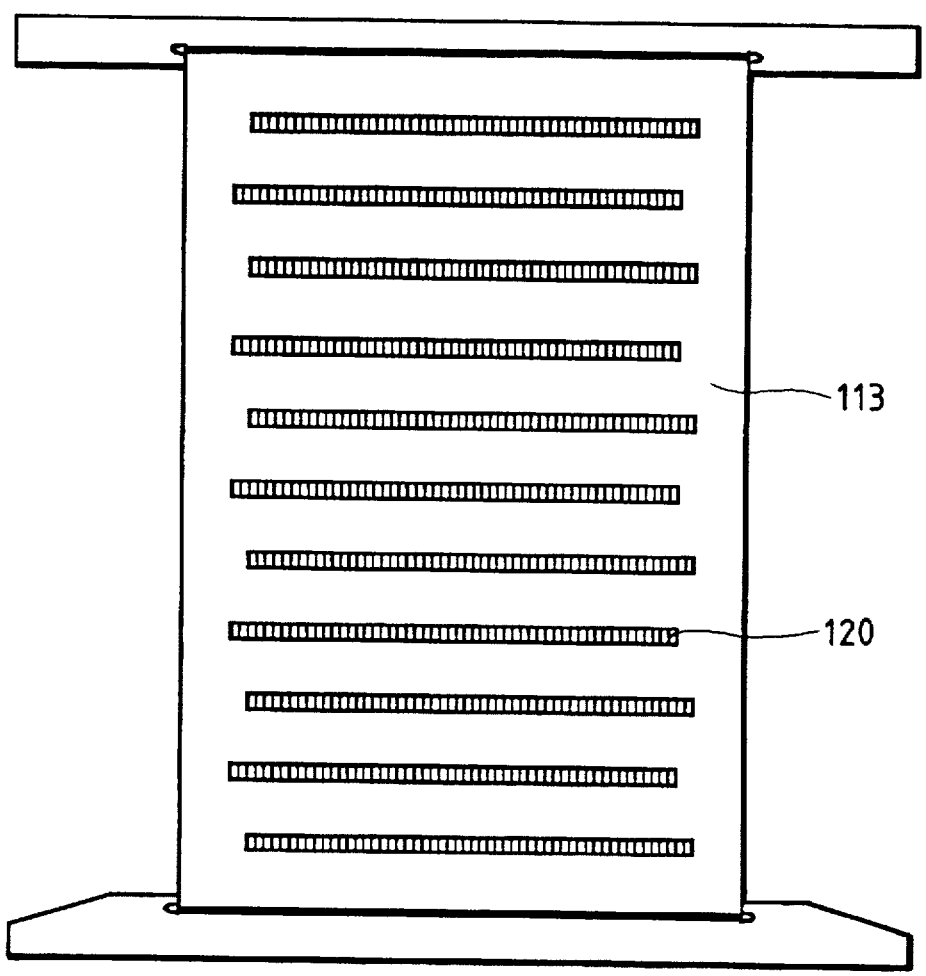
FIG. 21 is a schematic view of a flexible stamper of an embodiment 10, having staggered pattern arrangement.

FIG. 21 is a schematic view of a flexible stamper of an embodiment 10, having a staggered pattern arrangement.

FIGS. 30A to 30D are views showing steps of a method for producing a roller-shaped stamper of an embodiment 11 for an optical encoder scale, provided with the translucent area forming portions consisting of a mirror finish surface and the light shield area forming portions consisting of a coarse surface, wherein shown are a pattern 132 obtained by coating, exposure and development of photosensor; a glass substrate 128 bearing said pattern; a mirror finish surface portion 129 and a coarse surface portion 130, obtained by etching the patterned glass substrate and removing the remaining photoresist; and a mother stamper 313 obtained by forming the mirror finish surface portions and the coarse surface portions on the glass substrate.

Figure 31:
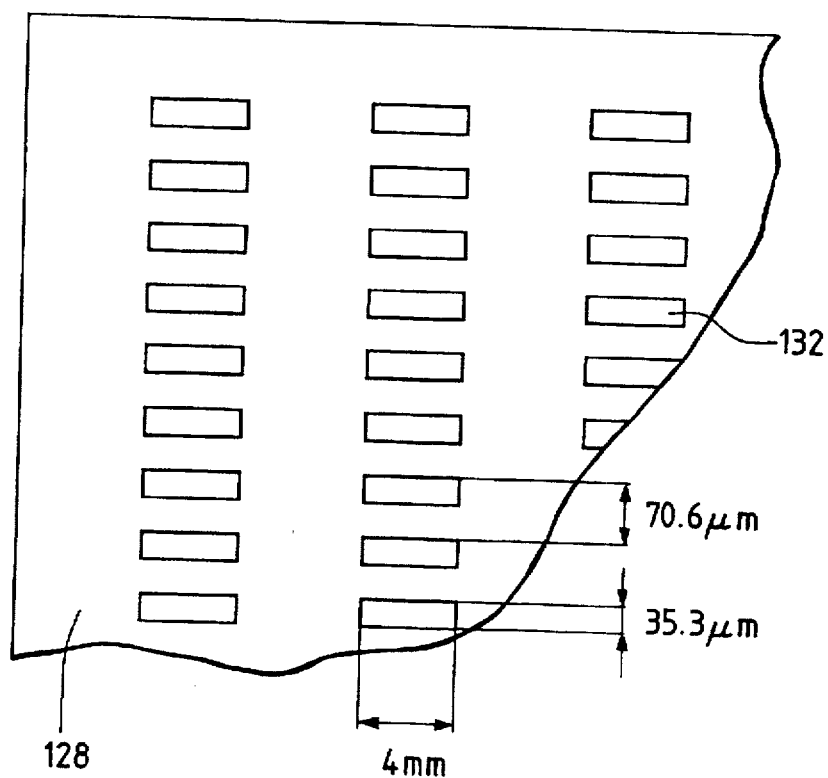
FIG. 31 is a schematic view of a patterned glass substrate in the embodiment 11.
Figure 32:
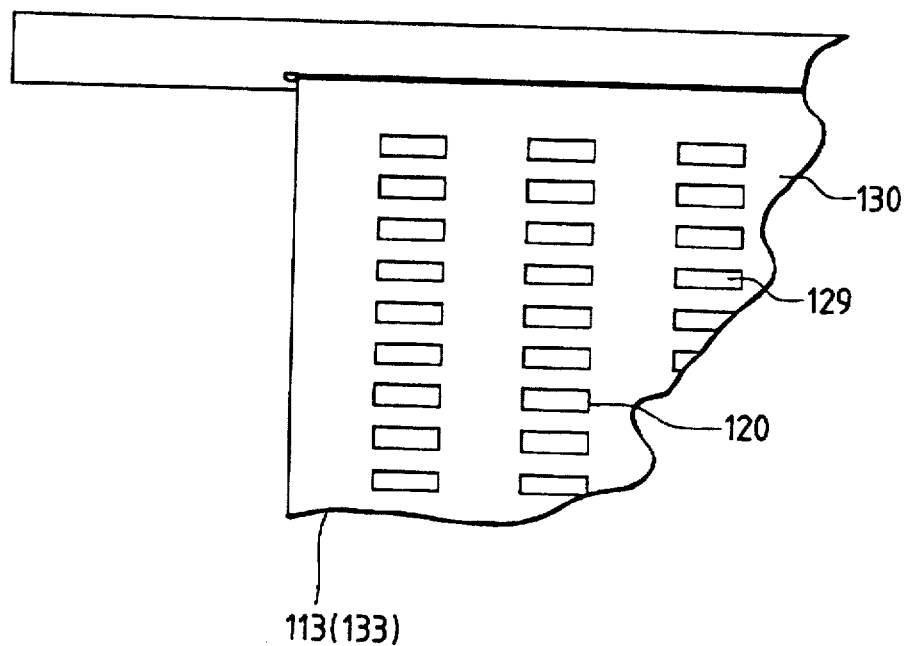
FIG. 32 is a schematic view of a flexible stamper prepared in the embodiment 11.

FIG. 31 is a schematic view of a patterned glass substrate of the embodiment 11. FIG. 32 is a schematic view of a flexible stamper prepared in the embodiment 5, wherein shown is a stamper A 133 having the mirror finish surface portions and the coarse surface portions in alternate manner (pattern of mirror finish surface areas arranged in the coarse surface).

FIGS. 33A to 33D are views of steps of a method for producing a roller-shaped stamper of an embodiment 12 for an optical encoder stamper, provided with the translucent area forming portions consisting of a mirror finish surface and the light shield area forming portions consisting of a coarse surface, wherein shown are a mask member 134 obtained by forming slits of a predetermined pattern of the optical encoder scale in a metal plate; and a sand blaster nozzle 135 for forming the coarse surface areas after the mask member is maintained in contact with the surface of the glass substrate. FIG. 34 is a schematic view of the mask member, wherein shown are a metal plate 137 constituting the mask member; and slits 136 for forming partial coarse surface portions on the glass substrate.

Figure 35:
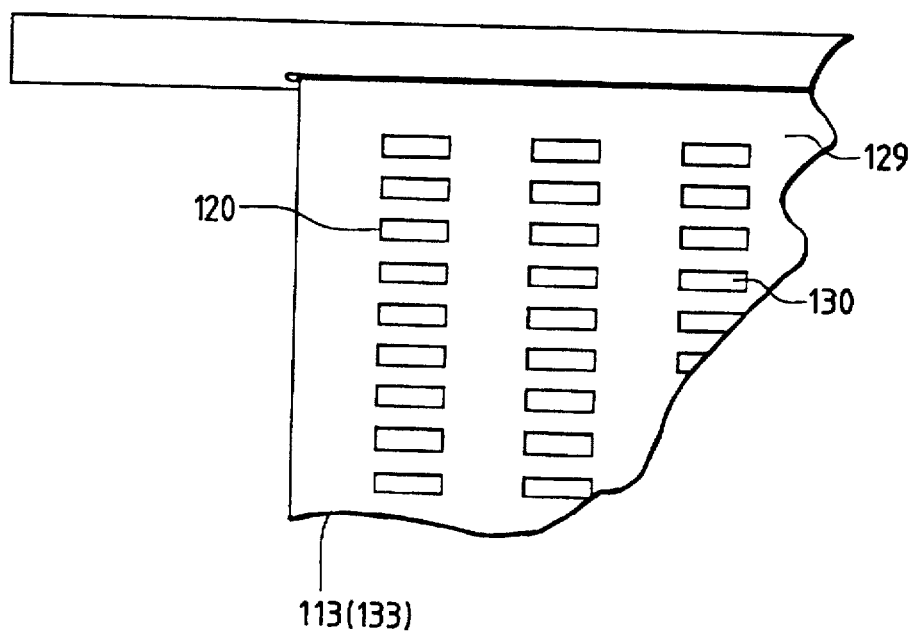
FIG. 35 is a schematic view of a flexible stamper prepared in the embodiment 12.

FIG. 35 is a schematic view of a flexible stamper B 138, prepared in an embodiment 12 and provided with the mirror finish surface forming portions and the coarse surface forming portions arranged in alternate manner (stamper having a pattern of coarse surface portions arranged in a mirror finish surface).

Figure 36A:
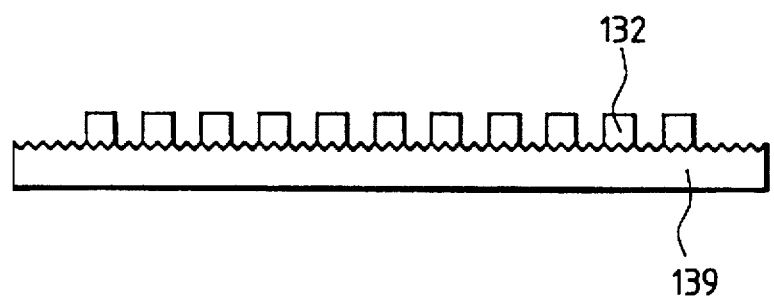
FIGS. 36A to 36C are views showing steps of a method for producing a roller-shaped stamper of an embodiment 13, for producing an optical encoder scale, provided with translucent area forming portions consisting of a mirror finish surface and light shielding area forming portions consisting of a coarse surface.
Figure 36B:
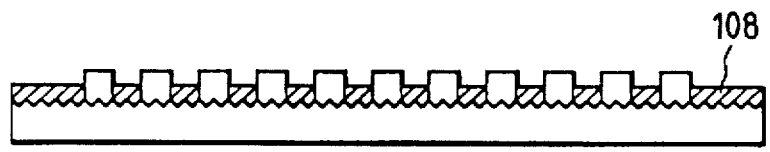
Figure 36C:
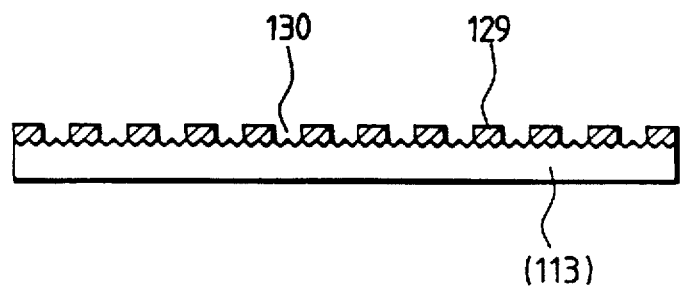

FIGS. 36A to 36C are views of steps of a method for producing a roller-shaped stamper of an embodiment 13 for an optical encoder scale, provided with the translucent area forming portions consisting of a mirror finish surface and the light shield area forming portions consisting of a coarse surface, wherein shown is a metal plate 139 having a coarse surface for forming the coarse surface forming portions.

Figure 37:
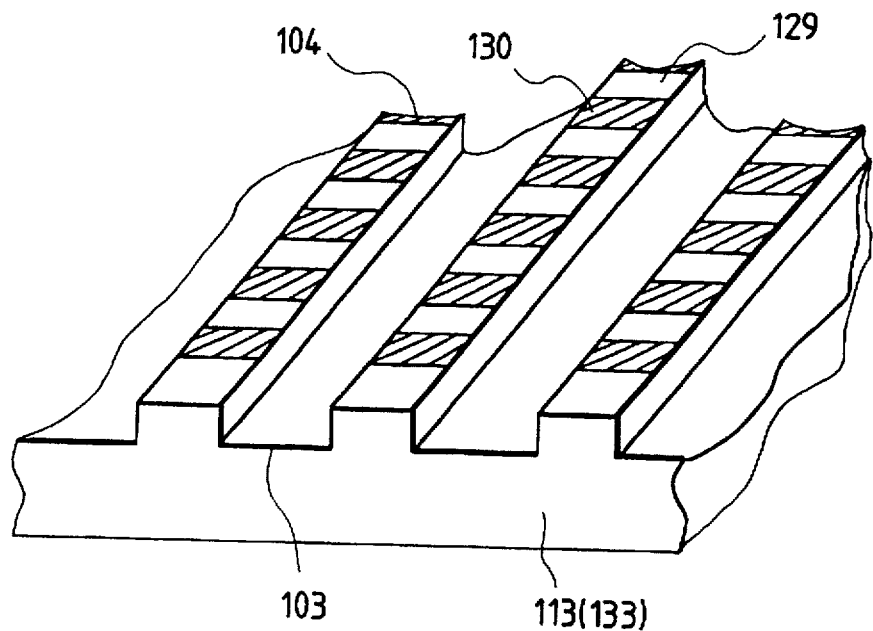
FIG. 37 is a schematic view of a pattern, corresponding to the optical scale, of a stamper prepared in the embodiment 13.

FIG. 37 is a schematic view of a pattern, corresponding to the optical scale, of a stamper prepared in an embodiment 13.

Figure 38A:
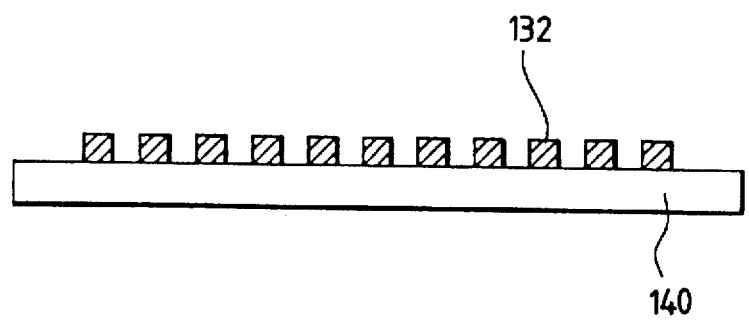
FIGS. 38A to 38C are views showing steps of a method for producing a roller-shaped stamper of an embodiment 14, for producing an optical encoder scale, provided with translucent area forming portions consisting of a mirror finish surface and light shielding area forming portions consisting of a coarse surface.
Figure 38B:
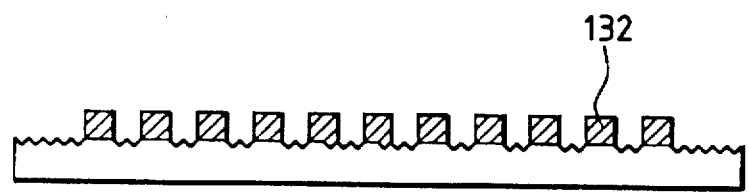
Figure 38C:
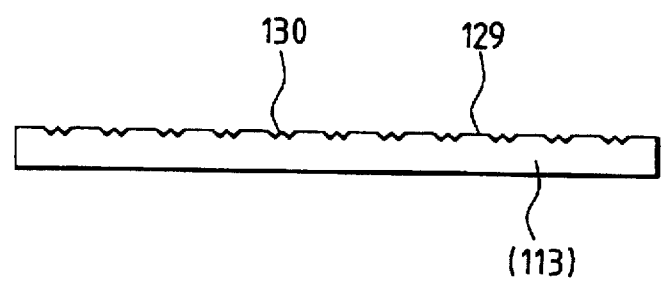

FIGS. 38A to 38C are views of steps of a method for producing a roller-shaped stamper of an embodiment 14 for an optical encoder scale, provided with the translucent area forming portions consisting of a mirror finish surface and the light shield area forming portions consisting of a coarse surface, wherein shown is a metal plate 140 having a mirror finish surface for forming the mirror finish surface forming portions.

Figure 39:
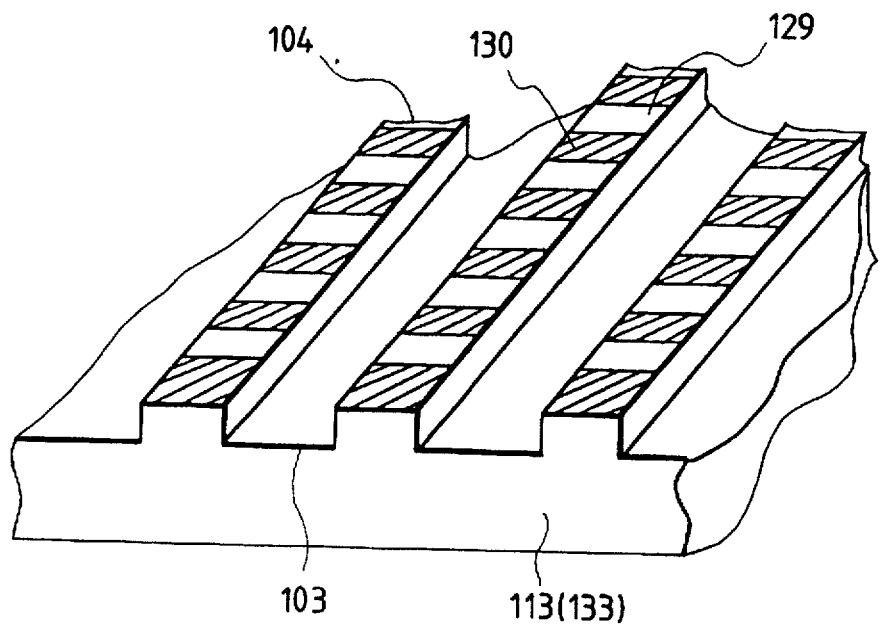
FIG. 39 is a schematic view of a pattern, corresponding to the optical scale, of a stamper prepared in the embodiment 14.

FIG. 39 is a schematic view of a pattern, corresponding to the optical scale, of a stamper prepared in the embodiment 14.

Figure 40A:
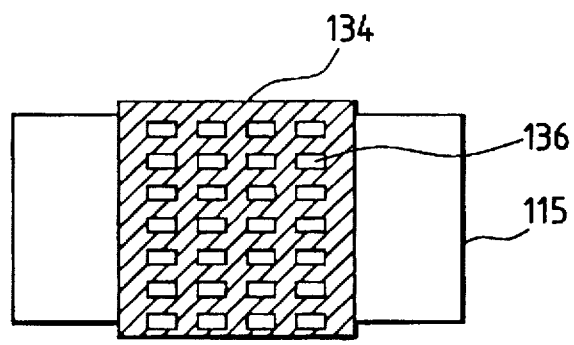
FIGS. 40A to 40C are views showing steps of a method for producing a roller-shaped stamper of an embodiment 15, for producing an optical encoder scale, provided with translucent area forming portions consisting of a mirror finish surface and light shielding area forming portions consisting of a coarse surface.
Figure 40B:
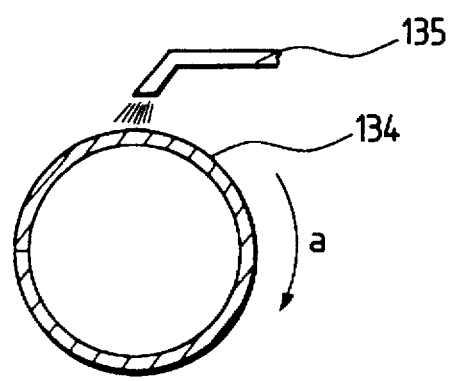
Figure 40C:
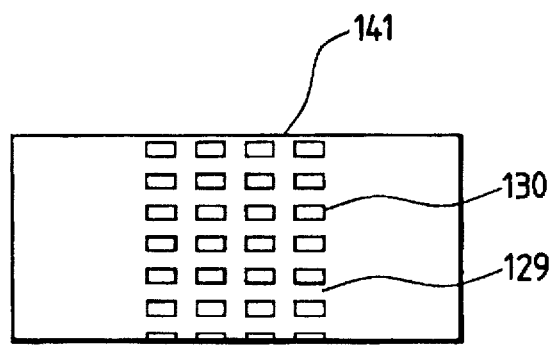

FIGS. 40A to 40C are views of steps of a method for producing a directly cut roller-shaped stamper of an embodiment 15 for an optical encoder scale, provided with the translucent area forming portions consisting of a mirror finish surface and the light shield area forming portions consisting of a coarse surface, wherein shown is a directly cut roller-shaped stamper 141, provided with the mirror finish area forming portions and the coarse area forming portions in an alternate arrangement, and prepared by sand blasting after the mask member is maintained in contact with the molding surface of a roller with the mirror finish surface.

Figure 41A:
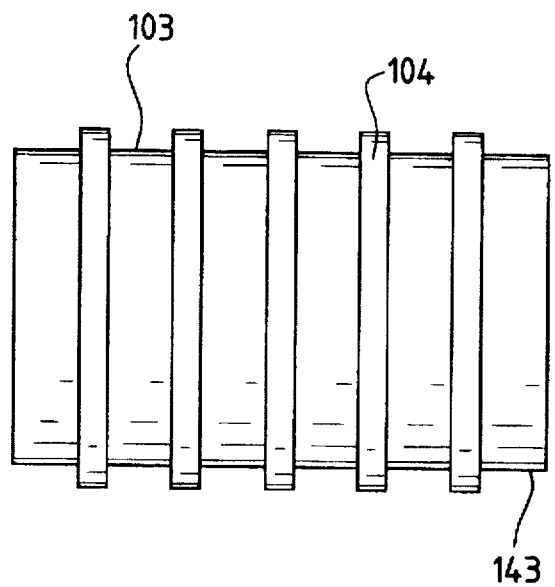
FIGS. 41A and 41B are views showing steps of a method for producing a directly cut roller-shaped stamper of an embodiment 16, for an optical encoder scale, provided with translucent area forming portions and light shielding area forming portions.
Figure 41B:
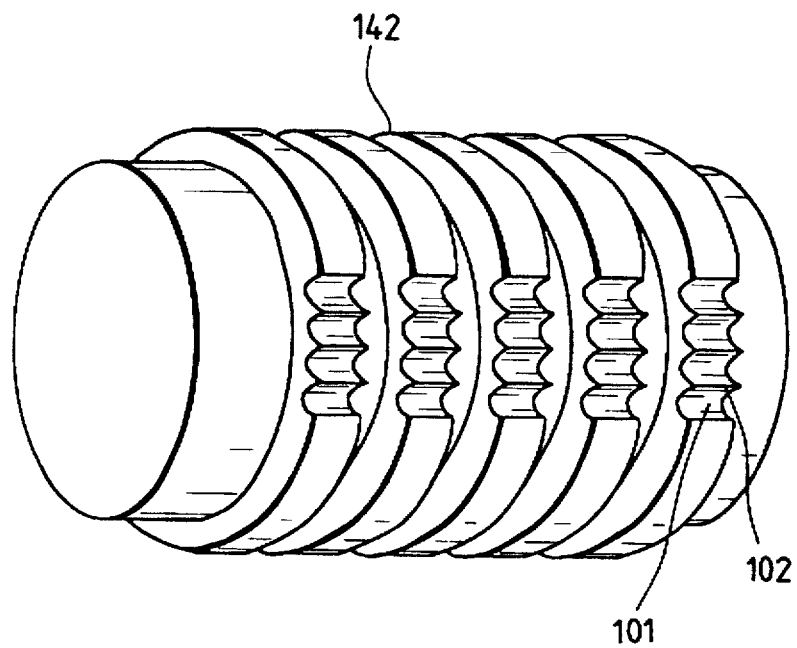

FIGS. 41A and 41B are views of steps of a method for producing a directly cut roller-shaped stamper of an embodiment 16 for an optical encoder scale, provided with the translucent area forming portions and the light shield area forming portions, wherein shown are a directly cut roller-shaped stamper 142 provided with the translucent area forming portions and the light shield area forming portions in alternate manner and prepared by directly cutting a roller with a mirror finish surface; and a roller 143 for direct cutting.

Figure 42A:
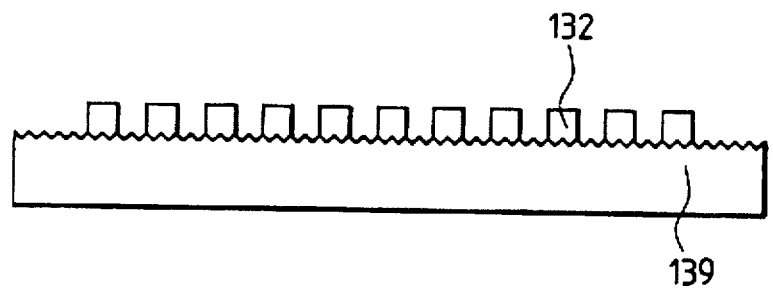
FIGS. 42A to 42C are views showing steps of a method for producing a roller-shaped stamper of an embodiment 17, for producing an optical encoder scale, provided with translucent area forming portions consisting of a mirror finish surface and light shielding area forming portions consisting of a coarse surface.
Figure 42B:
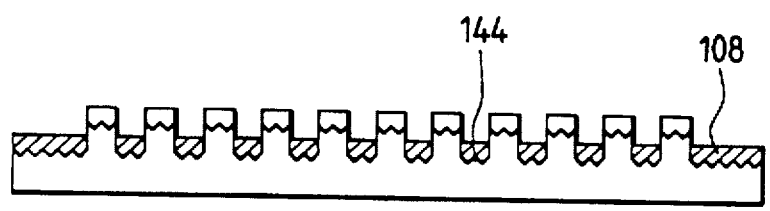
Figure 42C:
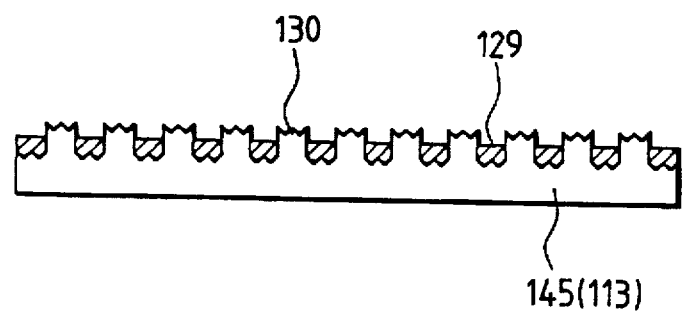

FIGS. 42A to 42C are views of steps of a method for producing a roller-shaped stamper for an optical encoder scale, provided with the translucent area forming portions consisting of a mirror finish surface and the light shield area forming portions consisting of a coarse surface, wherein shown are recesses 144 for forming the coarse area forming portions higher than the mirror finish area forming portions; and a flexible stamper 145, in which the coarse area forming portions are higher than the mirror finish area forming portions, prepared by filling the recesses with ultraviolet curable resin followed by planarization.

Figure 43:
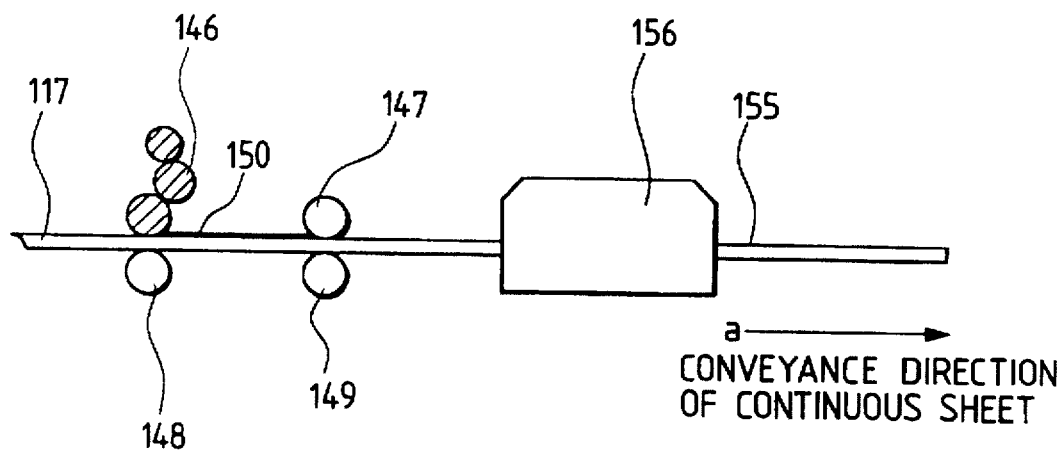
FIG. 43 is a schematic view showing the preparation of a continuous sheet for optical scale, bearing ink thereon in an embodiment 18.

FIG. 43 is a schematic view of a method for producing a continuous sheet for the optical scales, bearing ink thereon in an embodiment 18, wherein shown are an ink supply roller 146 for applying ink to a continuous sheet transported from a supply device; an auxiliary roller A 148 for assisting the ink application; an eliminating roller 147 for eliminating unnecessary ink from the continuous sheet; an auxiliary roller B 149 for assisting the ink application; a hot air dryer 156 for drying the ink applied only in the coarse (light shielding) area portions; and a continuous sheet 155 for optical scales, bearing ink only in the coarse (light shielding) area portions.

Figure 44A:
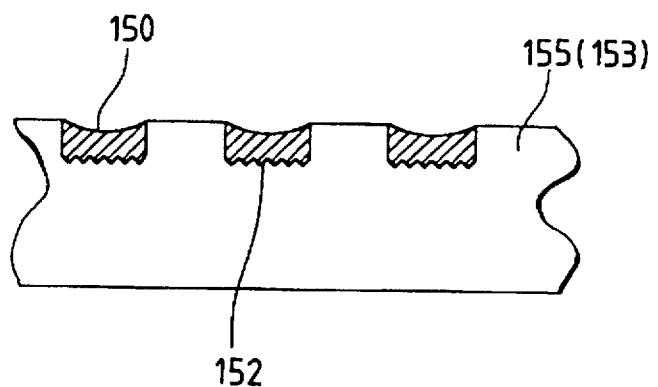
FIG. 44A is a detailed cross-sectional view of the continuous sheet of the embodiment 18, for optical scale, bearing ink thereon.
Figure 44B:
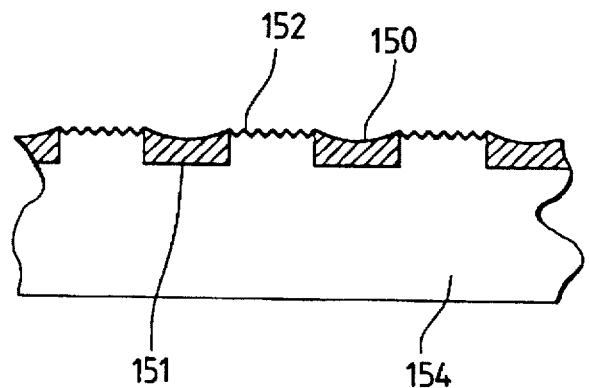
FIG. 44B is a detailed cross-sectional view of ink formation on a continuous sheet of a reference example 3, in which the coarse surface area is higher than the mirror finish surface area.

FIG. 44A is a detailed cross-sectional view of the continuous sheet bearing ink thereon, of the embodiment 18, for the optical scales, while FIG. 44B is a detailed cross-sectional view showing a state when ink is applied on a continuous sheet of a reference example 8 in which the coarse area forming portions are higher than the mirror finish area forming portions. There are shown ink 150 formed in the coarse (light shielding) areas; a light shield area 152 of the optical scale; a translucent area 151 of the optical scale; a continuous sheet 153 for optical scales, prepared with a flexible stamper 145 in which the coarse area forming portions are higher than the mirror finish area forming portions; and a continuous sheet 155 for the optical scales, with an improved contrast by ink formation in the coarse (light shielding) areas. Also shown in FIG. 44B is a continuous sheet 154 for the optical scales, prepared by a flexible stamper 138 in which the coarse area forming portions are lower than the mirror finish area forming portions.

Figure 45:
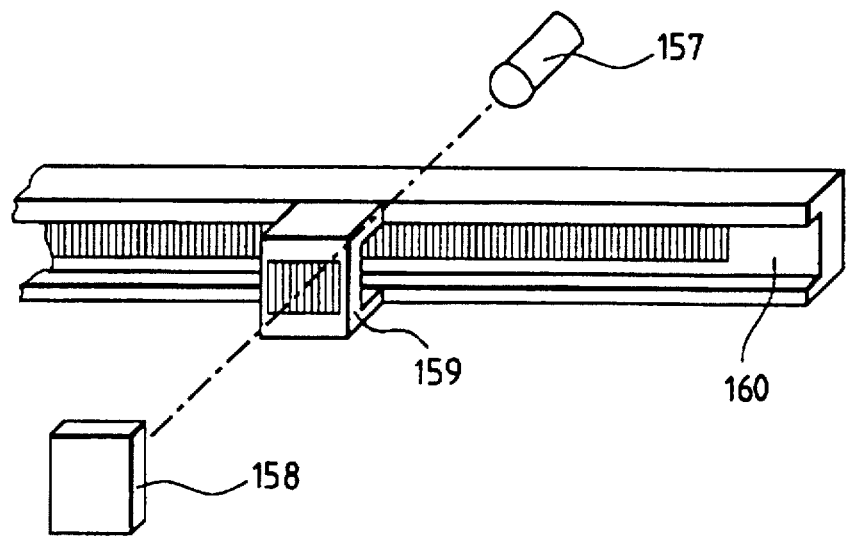
FIG. 45 is a perspective view of an optical encoder of an embodiment 19.

FIG. 45 is a perspective view of an optical encoder in an embodiment 19, wherein shown are a main scale 160 prepared with the continuous sheet of an embodiment 7; a subscale 159 prepared with the continuous sheet of said embodiment 7; a light-emitting device 157 constituting a light source; and a photosensor device 159 for receiving the light transmitted by the main scale and the sub scale.

Figure 46:
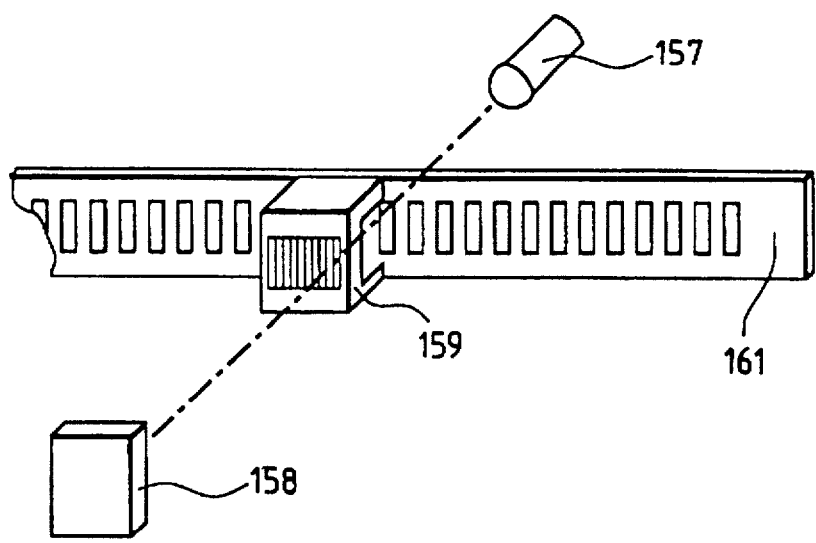
FIG. 46 is a perspective view of an optical encoder of a reference example 4.

FIG. 46 is a perspective view of an optical encoder of a reference example 9, wherein shown is a main scale 161 prepared with a lithographic photofilm.

In the following the present invention will be clarified in further details by embodiments thereof, but it is to be understood that the present invention is by no means limited by such embodiments.

[Embodiment 1]

Figure 6:
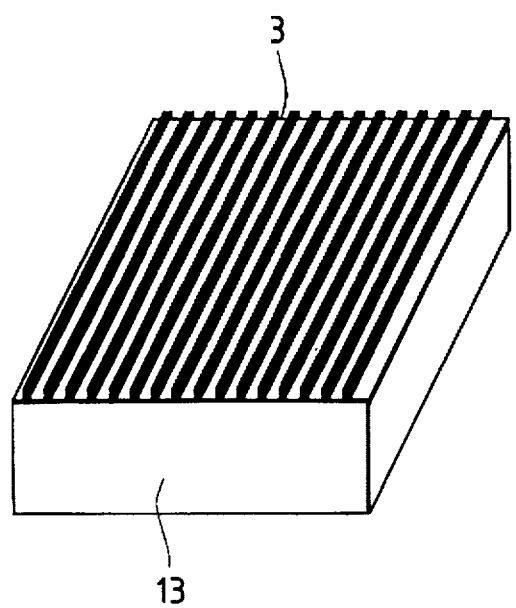
FIG. 6 is a schematic perspective view of an intermediate step for working a master material, employed in the preparation of the optical scale forming mold of the present invention.

A phosphor bronze plate of 450×200×80 mm was prepared as the material for the master mold and mounted on a cutting machine. At first a grooved phosphor bronze plate 13 as shown in FIG. 6 was prepared by forming 16 air ejecting grooves 3 of a depth of 60 μm and a width of 6 mm, with a pitch of 10 mm, parallel to the longer side, by means of a diamond grindstone.

Figure 7:
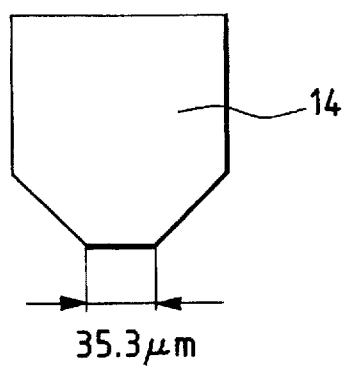
FIG. 7 is a schematic view of an example of the shape of a diamond bite employed in the preparation of the optical scale forming mold of the present invention.
Figure 8:
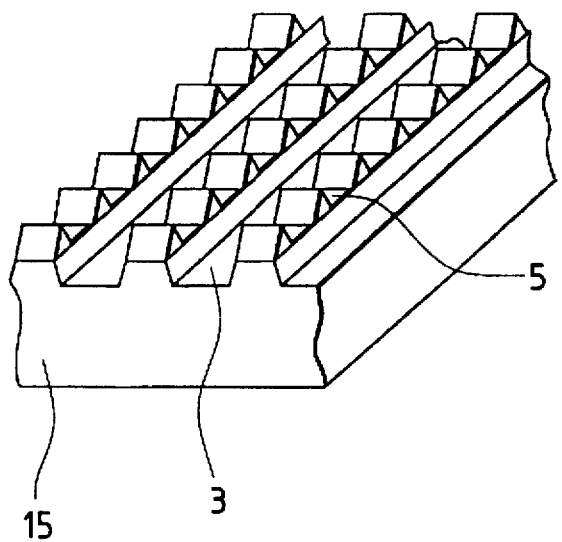
FIG. 8 is a schematic perspective view of an example of the shape of a master mold employed in the preparation of the optical scale forming mold of the present invention.

Then a trapezoidal diamond bite 14, having a straight tip of a width of 35.3 μm as shown in FIG. 7, was used to form 4700 trapezoidal grooves 5, with a pitch of 70.6 μm and a height of 30 μm from the air ejecting grooves 3, perpendicularly thereto as shown in FIG. 8, thereby obtaining a master mold 15 shown in FIG. 8.

Then dropped thereon was 30 g of sufficiently degassed ultraviolet curable resin consisting of 30 parts by weight of urethane acrylate, 67 parts by weight of neopentyl-glycole-denatured trimethylolpropane diacrylate and 3 parts by weight of 1-hydroxycyclohexylphenylketone.

Separately a glass plate of 480×250×15 mm was spin coated on a face thereof with 1 vol. % methanolic solution of silane coupling agent (trade name A-174; manufactured by Nippon Unicar Co., Ltd.) and baked for 2 hours in an oven of 70° C. The glass plate, with the face treated with the silane coupling agent downwards, was slowly placed on the ultraviolet curable resin from an end, and, when the ultraviolet curable resin was spread to the external edges, it was cured by the ultraviolet irradiation from a metal halide lamp (trade name UVC-2533; manufactured by Ushio Denki Co., Ltd.) under a condition of 160 W/cm$^2$ and a lamp distance of 130 mm.

Then the glass plate was peeled to obtain a glass master, bearing thereon the pattern of the optical scale formed by the ultraviolet curable resin. Said glass master was placed on a specimen stage of a sputtering apparatus (trade name SPF-530H; manufactured by Nichiden Anerva Co., Ltd.). The chamber was then evacuated to $4.0 \times 10^{-3}$ Pa, and reverse sputtering was conducted for 5 minutes with an Ar pressure of 1.2 Pa, and RF power of 1 kW and a glass revolution of 10 rpm.

Figure 9:
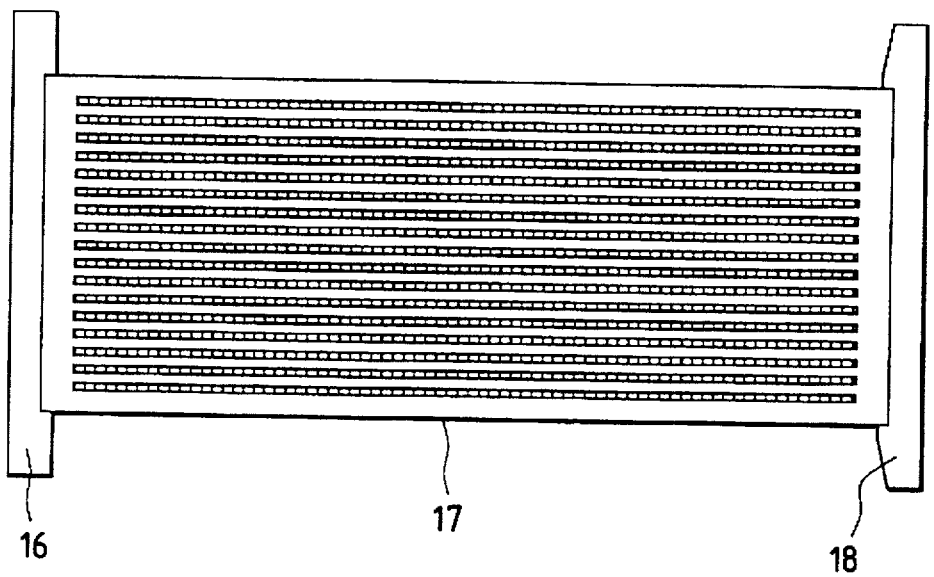
FIG. 9 is a schematic view of an example of the entire structure of the optical scale forming mold of the present invention.

Then a nickel film was sputtered to a thickness of 0.11 μm under the same conditions except for employing a DC power of 0.5 kW. Subsequently nickel was electroplated to a thickness of 200 μm and polished on the rear surface. The nickel mold thus formed was peeled in a clean room, then, after the application of a protective film on the effective area of the pattern, it was cut into a size of 440×180 mm and support members 16, 16' were fixed to the both shorter sides to obtain a mold 17 as shown in FIG. 9.

Figure 10:
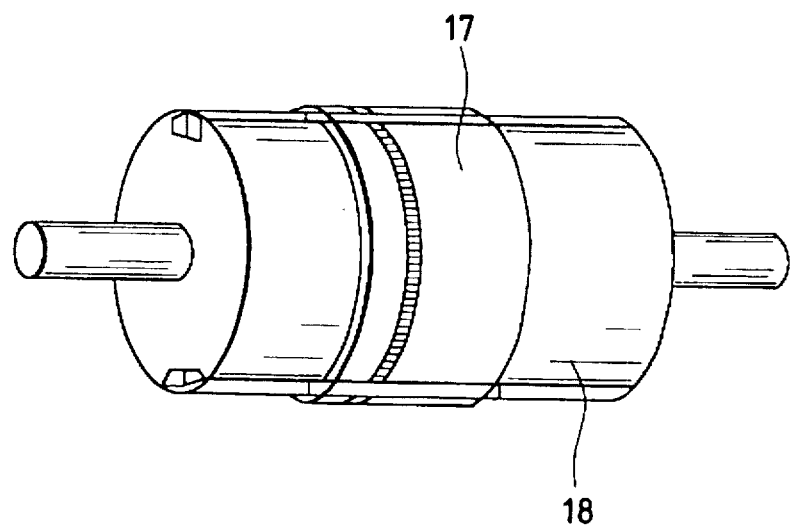
FIG. 10 is a perspective view of an example of the roller-shaped mold, bearing the optical scale forming mold of the present invention.

Subsequently the protective film was removed, and two molds of the above-mentioned size were mounted, each across a polyimide film of a size of 440×178 mm and a thickness of 100 μm, on a grooved roller of a diameter of 300 mmφ, having two grooves for accepting the support members. Then the groove between the support members was filled with silicone resin (trade name KE1204A; manufactured by Shinetsu Chemical Industries Co., Ltd.) which was subsequently cured for 30 minutes at 100° C., and the overflowing resin was removed with a cutter, whereby a roller-shaped mold 18 as shown in FIG. 10 was obtained.

The above-mentioned roller-shaped mold 18 was mounted on an extrusion molding apparatus as shown in FIG. 11, and a sheet of bisphenol-A polycarbonate (trade name S-2000R; manufactured by Mitsubishi Gas Chemical Co., Ltd.) was extruded from a T-die 20 under a pressure of a molding roller 19 of 2500 Kgf to the roller-shaped mold 18, thereby obtaining a continuous optical scale sheet 22 of a thickness of 0.3 mm and a width of 250 mm.

The molding was conducted continuously for 4 hours under the conditions of a T-die temperature 320° C., a surface temperature of 145° C. of the roller-shaped mold 18, a transport speed of 5 m/min. of the resin sheet and a resin extrusion rate of 27 kg/hr. Thus molded optical scales were inspected for the bubble defects, in 3 locations of 4×4 mm each in each optical scale pattern, but the detected defects were 10 or less and scarcely affected the performance of the optical scale.

The precision of transfer was at least 95%, and the optical scales of a very high quality could be obtained in a large amount within a short time.

In the present embodiment, the precision of transfer was evaluated, with a needle-type step measuring apparatus (trade name Alphastep 200; manufactured by Tencor Instruments Co.) by a ratio a/A, wherein A is the width of the translucent area of the glass master, measured under a needle pressure of 3 mg, a scanning range of 400 μm and a scanning time of 40 seconds while a is the measured width of the translucent area on the molded scale.

[Reference Example 1]

A roller-shaped mold was formed with two molds, prepared in the identical manner as in the Embodiment 1, except that the air electing grooves were not provided in the preparation of the master mold. This roller-shaped mold was used for molding the optical scales under the identical conditions as in the Embodiment 1, and the obtained optical scales were inspected for the bubble defects in 3 locations of 4×4 mm each in each scale pattern. The detected defects were in excess of 100, and the fluctuation of the signal amplitude was 10% or higher, which was unacceptable for the performance of the optical scale.

Also the precision of transfer, evaluated by the ratio a/A, was 0.8 or lower in some portions.

[Embodiment 2]

Figure 15:
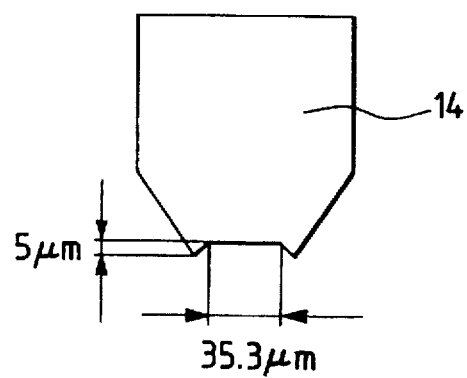
FIG. 15 is a schematic view of an example of the shape of a diamond bite employed in the preparation of the optical scale forming mold of the present invention.

At first, as in the Embodiment 1, a phosphor bronze plate 13 with the air ejecting grooves 3 as shown in FIG. 6 was prepared. Then a master mold was prepared with a bite 14 of a tip shape as shown in FIG. 15 by forming trapezoidal grooves 5 as shown in FIG. 8, perpendicularly to the air ejecting grooves 3 with a pitch of 70.6 μm, a height difference of 30 μm to the air ejecting grooves 3, also with a height difference of 5 μm between the translucent area 5 shown in FIG. 2 and the air ejecting groove 6 at the boundary and a width of 35.3 μm of a flat portion in the translucent area.

After rinsing, hard nickel plating of a thickness of 0.1 μm was applied to the surface for anticorrosion and increase of surface hardness, thus obtaining a master mold.

Subsequently a glass master and then two molds were prepared in the same manner as in the Embodiment 1, and a roller-shaped mold was prepared by mounting these molds on a grooved roller across polyimide sheets and filling the groove between the support members with silicone resin.

This roller-shaped mold was used in the same apparatus as in the Embodiment 1 for producing a continuous optical scale sheet of a thickness of 0.25 mm and a width of 240 mm by extruding an amorphous polyolefin sheet (trade name Zeonex 250; manufactured by Nippon Zeon Co., Ltd.) from the T-die under a pressure of 2000 kgf of the molding roller to the roller-shaped mold.

The molding was conducted continuously for 3 hours under the conditions of a T-die temperature of 330° C., a roller-shaped mold surface temperature of 145° C., a resin sheet speed of 4 m/min. and a resin extrusion rate of 14.5 kg/hr. The optical scales thus obtained were inspected for the bubble defects in 3 locations of 4×4 mm each in each scale pattern, but the detected defects were 10 or less and scarcely affected the performance of the optical scale. Also the precision of transfer was at least 95%, and the optical scales of a very high quality could be obtained in a large amount within a short time.

[Embodiment 3]

On the two stampers employed in the Embodiment 1, a polyimide film of a width of 3 mm, a length of 430 mm and a thickness of 100 μm was adhered to the rear face of each of 17 pattern portions, with instant adhesive (trade name SC-55; manufactured by Sony Chemical Co., Ltd.).

These two stamper were employed in the preparation of a continuous optical scale sheet of a thickness of 0.3 mm and a width of 250 mm, with bisphenol-A polycarbonate resin (trade name Panlite-L-1225; manufactured by Teijin Chemical Co., Ltd.), under the same conditions as in the Embodiment 1. In the same evaluation as in the Embodiment 1, the detected defects were 8 or less, and the precision of transfer was at least 95%. Thus the optical scales of a very high quality could be produced in a large amount, within a short time.

[Embodiment 4]

A phosphor bronze plate, having a same size as in the Embodiment 1 and bearing grooves same as therein and as shown in FIG. 6, was prepared and mounted in a cutting machine, with an angle of 45° to the cutting direction of the bit.

Figure 13:
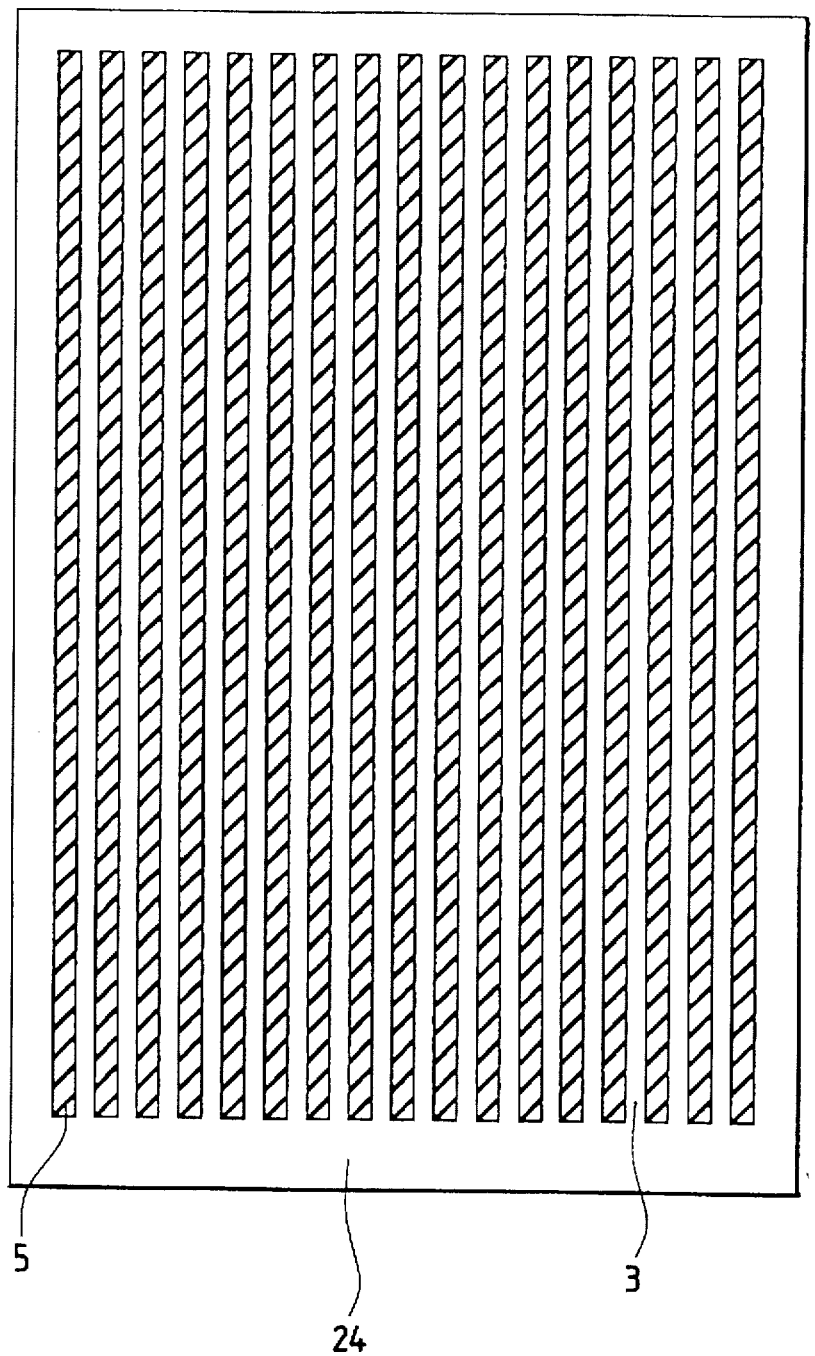
FIG. 13 is a schematic view of another embodiment of the master mold employed in the preparation of the optical scale forming mold of the present invention.

Then a trapezoidal diamond bite 14 having a straight tip of a width of 35.3 μm as shown in FIG. 7 was used to form trapezoidal grooves 5 of a pitch 70.6 μm, over the entire surface of the phosphor bronze plate, with an angle of 45° to the air ejecting grooves 3 and with a height of 25 μm of to the air ejecting grooves 3 to the trapezoidal groove 5. Then rinsing and hard nickel plating (0.1 μm thick) were conducted to obtain a master mold 24 shown in FIG. 13.

Then dropped thereon was 30 g of well degassed ultraviolet curable resin consisting of 30 parts by weight of urethane acrylate, 67 parts by weight of neopentylglycole denatured trimethylolpropane diacrylate and 3 parts by weight of 1-hydroxycyclohexylphenylketone.

Separately a glass plate of 480×250×15 mm was spin coated on a face thereof with 1 vol. % methanolic solution of silane coupling agent (trade name A-174; manufactured by Nippon Unicar Co., Ltd.) and baked for 2 hours at 70° C. The glass plate, with the face treated with the silane coupling agent downwards, was slowly placed on the ultraviolet curable resin from an end, and, when the ultraviolet curable resin was spread to the external edges, it was cured by the ultraviolet irradiation from a metal halide lamp (trade name UVC-2533; manufactured by Ushio Denki Co., Ltd.) under a condition of 160 W/cm$^2$ and a lamp distance of 130 mm. Then the glass plate was peeled to obtain a glass master, bearing thereon the pattern of the optical scale formed by the ultraviolet curable resin. Said glass master was placed on a specimen stage of a sputtering apparatus (trade name SPF-530H; manufactured by Nichiden Anerva Co., Ltd.). The chamber was then evacuated to 4.0×10$^{-3}$ Pa, and reverse sputtering was conducted for 5 minutes with an Ar pressure of 1.2 Pa, an RF power of 1 kW and a glass revolution of 10 rpm.

Figure 12:
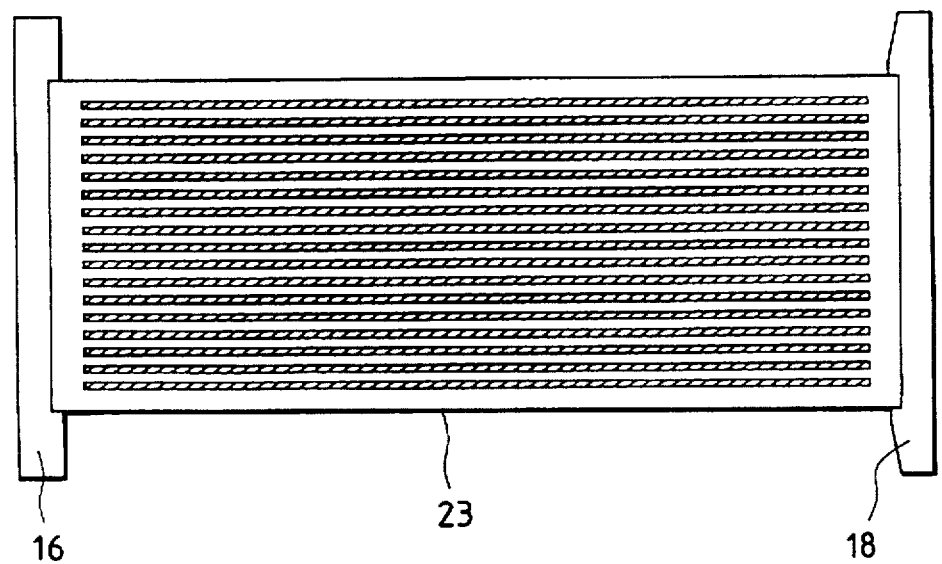
FIG. 12 is a schematic view of another embodiment of the entire structure of the optical scale forming mold of the present invention.

Then a nickel film was sputtered to a thickness of 0.11 pm under the same conditions except for employing a DC power of 0.5 kW. Subsequently nickel was electroplated to a thickness of 200 µm and polished on the rear surface. The nickel mold thus formed was peeled in a clean room, then, after the application of a protective film on the effective area of the pattern, it was cut into a size of 440×180 mm and support members 16, 18 were fixed to the both shorter sides to obtain a mold 23, having oblique trapezoidal grooves, as shown in FIG. 12.

A roller-shaped mold was prepared with two such stampers as in the Embodiment 1, and a continuous optical scale sheet of a thickness of 0.6 mm and a width of 250 mm was produced under the same conditions as in the Embodiment 1, except for employing bisphenol-A polycarbonate resin (trade name H-3000R; manufactured by Mitsubishi Gas Chemical Co.) with a resin sheet speed of 1.2 m/min. and a resin extrusion rate of 13 kg/hr.

In the evaluation same as in the Embodiment 1, the detected defects were 3 or less and the precision of transfer was at least 95%. Thus the optical scales of a very high quality could be produced in a large amount within a short time.

[Embodiment 5]

A copper plate of 470×220×60 mm, as the material for the master mold, was subjected to groove formation as in the Embodiment 1 and mounted on a cutting machine.

Then a bite with a rectangularly pointed tip was used to cut the entire surface of the copper plate, parallel to the shorter ends thereof, with a pitch of 70.6 µm, to obtain triangular parallel grooves over the entire surface. Then the trapezoidal bite used in the Embodiment 1 was used to cut the copper plate, with a pitch of 70.6 µm, until the triangular peaks are eliminated (about 3.5 µm from the top of the triangular peak). Then rinsing and hard nickel plating (thickness 0.1 µm) were applied to obtain a master mold, of which structure is schematically shown in FIG. 5.

Then dropped thereon was 30 g of well degassed ultraviolet curable resin consisting of 30 parts by weight of urethane acrylate, 67 parts by weight of neopentylglycol-denatured trimethylolpropane diacrylate and 3 parts by weight of 1-hydroxycyclohexylphenylketone.

Separately a glass plate of 480×250×15 mm was spin coated, on a face thereof, with 1 vol. % methanolic solution of silane coupling agent (trade name A-174; manufactured by Nippon Unicar Co., Ltd.) and baked for 2 hours in an oven of 70° C. The glass plate, with the face treated with the silane coupling agent downwards, was slowly placed on the ultraviolet curable resin from an end, and, when the ultraviolet curable resin was spread to the external edges, it was cured by the ultraviolet irradiation from a metal halide lamp (trade name UVC-2533; manufactured by Ushio Denki Co., Ltd.) under a condition of 160 W/cm$^2$ and a lamp distance of 130 mm.

Then the glass plate was peeled to obtain a glass master, bearing thereon the pattern of the optical scale formed by the ultraviolet curable resin. Said glass master was placed on a specimen stage of a sputtering apparatus (trade name SPF-530H; manufactured by Nichiden Anerva Co., Ltd.). The chamber was then evacuated to 4.0×10$^{-3}$ Pa, and reverse sputtering was conducted for 5 minutes with an Ar pressure of 1.2 Pa, an RF power of 1 kW and a glass revolution of 10 rpm.

Then a nickel film was sputtered to a thickness of 0.11 µm under the same conditions except for employing a DC power of 0.5 kW. Subsequently nickel was electroplated to a thickness of 160 µm and polished on the rear surface. The nickel mold thus formed was peeled in a clean room, then, after the application of a protective film on the effective area of the pattern, it was cut into a size of 440×180 mm and support members 16, 18 were fixed to the both shorter sides to obtain a mold 23, having oblique trapezoidal grooves as shown in FIG. 12.

A roller-shaped mold was prepared with two such stampers in the same manner as in the Embodiment 1, except for employing polyimide sheets of a thickness of 125 µm, and a continuous optical scale sheet of a thickness of 0.3 mm and a width of 250 mm was prepared under the same conditions as in the Embodiment 1.

In the evaluation same as in the Embodiment 1, the detected defects were 3 or less and the precision of transfer was at least 95%. Thus the optical scales of a very high quality could be produced in a large amount within a short time.

[Embodiment 6]

A roller-shaped mold 18 shown in FIG. 10 was prepared in a process similar to that of the Embodiment 1.

It was mounted on a molding apparatus as shown in FIG. 14, and a molding roller 19' coated with silicone rubber was mounted with an angle of 15° to the roller-shaped mold 18. The molding roller 19' was surfacially coated with silicone rubber of a thickness of 20 mm.

A continuous optical scale sheet of a thickness of 0.25 mm and a width of 240 mm was prepared, as shown in FIG. 11, by extruding bisphenol-A polycarbonate resin (trade name S-2000R; manufactured by Mitsubishi Gas Chemical Co., Ltd.) from the T-die 20, with a pressure of 1300 kgf of the molding roller 19' to the roller-shaped mold 18.

The molding was conducted under the conditions of a T-die temperature of 330° C., a mold surface temperature of 138° C., a sheet speed of 6 m/min., and a resin extrusion rate of 26.0 kg/hr.

The optical scales thus obtained were inspected for the bubble defects, in 3 locations of 4×4 mm each in each scale pattern, but the detected defects were 5 or less and scarcely affected the performance of the optical scale. Also the precision of transfer was as high as at least 95%.

[Embodiment 7]

At first there will be explained a method for producing a flexible stamper by electroplating, with reference to FIGS.

25A to 25C showing the steps for producing a phosphor bronze master plate and FIGS. 26A to 26F showing the steps for producing a flexible stamper.

At first, as shown in FIG. 25A, grooves of a depth of 60 μm and a width of 6 mm were formed as sliding face forming portions 103, on the surface of a phosphor bronze substrate 105 of 450×200×80 mm, thereby obtaining 11 pattern forming portions 104 corresponding to the optical scale of a width of 4 mm. Said sliding face forming portions 103 were formed with a sintered diamond bite, on a mirror-finished phosphor bronze substrate 105 mounted on a cutting machine.

Then, as shown in FIG. 25B, in the pattern forming portion 104 corresponding to the optical scale, there were formed translucent area forming portions 101 and light shield area forming portions 102 by a monocrystalline diamond bite A6. After the sintered diamond bite was replaced by the monocrystalline diamond bite A, the cutting direction was changed by 90° to cut the translucent area forming portions 101 perpendicularly to the pattern forming portions 104. Otherwise the phosphor bronze substrate 105 may be remounted on the cutting machine with an angle change by 90°. Thus 4700 cut lines were formed with a cutting depth of 35 μm and a pitch of 70.6 μm. The monocrystalline diamond bite A had a curved end as shown in FIG. 27, and could therefore provide a stamper for optical encoder scale, provided with an air ejecting mechanism.

After the cutting operation, rinsing and hard nickel placing of a thickness of 1000 Å for anticorrosion and surface hardening were applied to obtain a phosphor bronze master (father stamper) 107 shown in FIG. 25C.

Figure 26A:
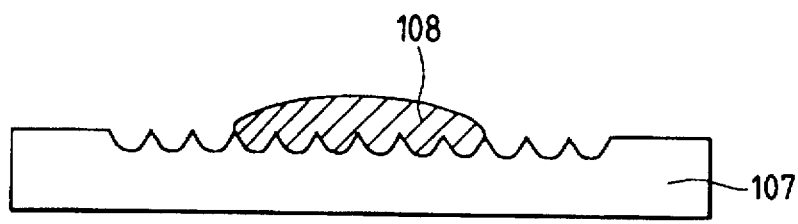
FIGS. 26A to 26F are views showing steps of a method for producing the flexible stamper of the present invention.
Figure 26B:
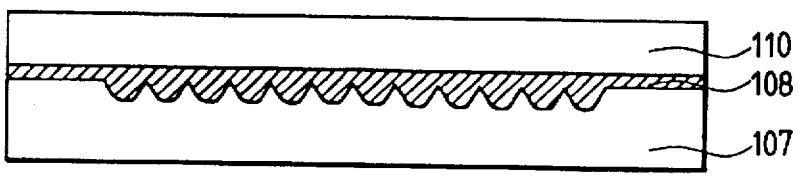
Figure 26C:
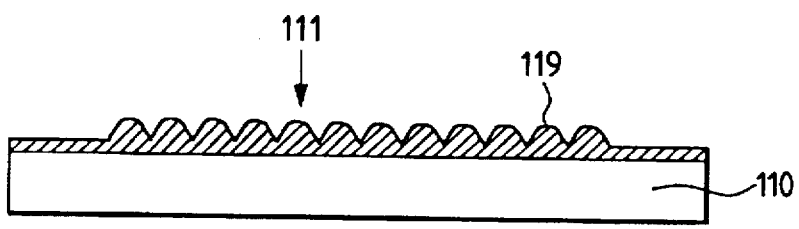

Then, as shown in FIG. 26A, on the patterned surface of the phosphor bronze master 107, there was dropped 30 g of well degassed ultraviolet curable resin 108 consisting of 30 parts by weight of urethane acrylate, 67 parts by weight of neopentylglycol-denatured trimethylolpropane diacrylate and 3 parts by weight of 1-hydroxycyclohexylphenylketone.

Separately a glass plate 110 of 480×250×15 mm was spin coated, on a face thereof, with 1 vol. % methanolic solution of silane coupling agent (trade name A-174; manufactured by Nippon Unicar Co., Ltd.) and baked for 2 hours in an oven of 70° C. The glass plate, with the face treated with the silane coupling agent downwards, was slowly placed on the ultraviolet curable resin 108 from an end, and, when the resin 108 spread to the external edges, it was cured by the ultraviolet irradiation from a metal halide lamp (trade name UVC-2533; manufactured by Ushio Denki Co., Ltd.) under a condition of 160 W/cm$^2$ and a lamp distance of 130 mm. After the resin curing, the glass plate was peeled off from the phosphor bronze master 107 to obtain a glass master 111, bearing the scale pattern on a face thereof.

Figure 26D:

In a step shown in FIG. 26D, a conductive treatment is executed by a film forming apparatus such as a sputtering apparatus or an evaporation apparatus, as a pre-treatment for metal film formation by electroplating. A conductive nickel film 109 of a thickness of 1000 Å was formed by sputtering on the glass master 111, in the following manner. The above-mentioned glass master 111 was mounted on a specimen stage of a sputtering apparatus (trade name SPF-530H; manufactured by Nichiden Anerva Co., Ltd.) and the effective area was protected with a mask plate. Then the chamber was evacuated to 4.0×10$^{-3}$ Pa, and reverse sputtering was conducted for 10 minutes with an RF power of 1 kW and a glass revolution of 10 rpm. Then a nickel film of a thickness of 1000 Å was formed under the same conditions except for employing a DC power of 0.5 kW.

Figure 26E:
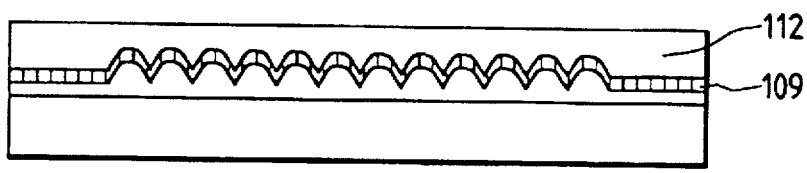
Figure 26F:
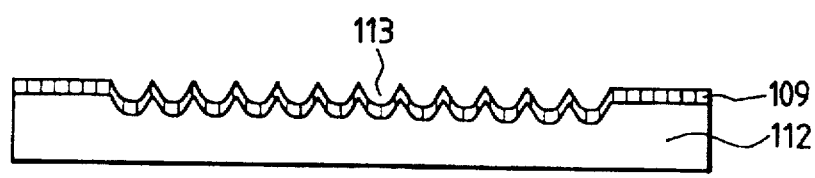

In steps shown in FIGS. 26E and 26F, a metal film 112 is formed by electroplating on the glass master 111 bearing the conductive film 109.

The metal film 112 was formed by depositing metallic nickel of 100–200 pm, in a nickel sulfamate electroplating bath, with an integrated current of 180–360 AH while the glass master 111 bearing the conductive film 109 is rotated at 20–30 rpm.

The above-mentioned electroplating bath had the following composition:

| Nickel sulfamate tetrahydrate [Ni(NH$_2$SO$_3$)$_2$·4H$_2$O] | |
|---|---|
| | 500 g/l. |
| Boric acid [H$_3$BO$_3$] | 35–38 g/l. |
| Antipitting agent | 2.5 ml/l. |

Then the metal film 112 was polished, and, in a final step shown in FIG. 26F, the conductive film 109 and the metal film 112 were integrally peeled off from the glass master 111, then trimmed by laser cutting into a size of 440×180 mm. The fixing members were welded to the shorter sides at both ends to obtain a flexible stamper 113 (122) as shown in FIGS. 16A, 16B and 23, bearing a pattern 20 corresponding to the optical encoder scale with translucent area forming portions and light shield area forming portions (35.3 μm/35.3 μm) and a step difference of 22.6 μm.

The above-mentioned flexible stampers 113 (122) for the optical encoder scale were mounted on a roller provided in advance with grooves substantially matching the fixing members, across polyimide films of a size of 440×178 mm and a thickness of 100 μm, then the gap between the fixing members was filled with silicone resin (trade name KE1204A; KE1204B) which was subsequently cured for 30 minutes at 100° C., and the overflowing resin was removed with a cutter to obtain a roller-shaped stamper 114 as shown in FIGS. 16A and 19A. In this embodiment, as shown in FIG. 16A, the translucent area forming portions and the light shield area forming portions are arranged parallel to the molding direction.

Thus the extrusion molding is conducted in a direction a shown in FIG. 16B. FIG. 17B is a detailed cross-sectional view along a line 17B—17B in FIG. 16B.

The above-mentioned roller-shaped stamper was mounted on an apparatus shown in FIG. 24, and a continuous optical scale sheet of a thickness of 0.3 mm and a width of 250 mm was produced by extruding molten bisphenol-A polycarbonate resin (trade name H-3000R; manufactured by Mitsubishi Gas Chemical Co.) from a T-die 116 of an extruder 118 at a resin temperature of 280° C.–340° C., and passing the resin between the roller-shaped stamper 114 and a mirror finish roller 115 while maintaining a pressure of 2500 kgf therebetween. FIG. 17B shows the state of molding with the stamper 122 provided with the air ejecting mechanism.

The molding was conducted continuously for 4 hours, under the conditions of a T-die temperature of 320° C., a stamper surface temperature of 145° C., a resin sheet speed of 5 m/min. and a resin extrusion rate of 27 kg/hr. The optical scales thus formed were inspected for the bubble defects in three locations for 4×4 mm each in each scale pattern, but the detected defects were 10 or less and scarcely affected the performance of the optical scales.

Also the precision of transfer was at least 95%, and thus the optical scales of a very high quality could be produced in a large amount within a short time.

In the present embodiment, the precision of transfer was measured with a needle-type step difference measuring apparatus (trade name Alphastep 200; manufactured by Tencor Instruments Co.) under the conditions of a scanning range of 400 μm, a scanning time of 40 seconds and a needle pressure of 3 mg.

The precision of transfer was evaluated by a ratio a/A, wherein A is the measured width of the translucent area of the glass master while a is the measured width of the translucent area on the molded optical scale.

[Reference Example 2]

In the preparation of the phosphor bronze master, a monocrystalline diamond bite B 25 as shown in FIG. 28 was employed for forming the translucent area forming portions 1 and the light shield area forming portions 2 in the pattern forming portion 104 corresponding to the optical scale, by cutting 4700 lines with a cut depth of 30 μm and a pitch of 70.6 μm. Other steps were conducted as in the Embodiment 7 to obtain a stamper 121 without the air ejecting mechanism. FIG. 18 is a perspective view of the stamper 121 without the air ejecting mechanism.

The stampers were mounted on a roller, provided in advance with grooves substantially matching the fixing members, in a similar manner as in the Embodiment 7, thereby providing a roller-shaped stamper 114 (121) as shown in FIGS. 16A and 23, wherein the translucent area forming portions and the light shield area forming portions are arranged parallel to the molding direction.

The above-mentioned roller-shaped stamper 114 (121) was employed in producing a continuous optical scale sheet of a thickness of 0.3 mm and a width of 250 mm, under the same conditions as in the Embodiment 1. As a result, bubble defects 123 as shown in FIG. 17A were generated because the extrusion molding was conducted in a direction a shown in FIG. 18. FIG. 17A is a detailed cross-sectional view along a line 17A—17A in FIG. 18. Each optical scale pattern, when inspected in three locations of 4×4 mm each, showed 50 to 100 defects. Also the fluctuation of the signal amplitude was 10% or higher, indicating insufficient performance as the optical scale. Also the precision of transfer, evaluated in the same manner as in the Embodiment 7, was lower than 80% in the ratio a/A in some locations.

[Embodiment 8]

At first, as shown in FIG. 25A, grooves of a depth of 60 μm and a width of 6 mm were formed as sliding face forming portions 103, on the surface of a phosphor bronze substrate 105 of 450×200×80 mm, thereby obtaining 11 pattern forming portions 104 corresponding to the optical scale of a width of 4 mm, with a pitch of 10 mm. Said sliding face forming portions 103 were formed with a sintered diamond bite, on a mirror-finished phosphor bronze substrate 105 mounted on a cutting machine.

Then a monocrystalline diamond bite B 25 shown in FIG. 28 was employed for forming translucent area forming portions 101 and light shield area forming portions 102, in the pattern forming portion 104 corresponding to the optical scale, as shown in FIG. 25A. After the sintered diamond bite was replaced by the monocrystalline diamond bite A, the cutting direction was changed by 90° to cut the translucent area forming portions 101 perpendicularly to the pattern forming portions 104. In order to form the translucent area forming portion 101 into a convex surface, the cutting depth was selected as 50 μm at both ends of the pattern forming portion 104 corresponding to the optical scale and 30 μm at the center thereof. There were cut 4700 lines with a pitch of 70.6 μm.

After the cutting operation, rinsing was conducted, and hard nickel plating was applied with a thickness of 1000 Å for anticorrosion and surface hardening, thereby obtaining a phosphor bronze master (father stamper) 107.

Then three glass masters 111 were prepared in the same manner as in the Embodiment 7, subsequently the process was conducted to the polishing step, and the conductive film 109 and the metal film 112 were integrally peeled off from the glass masters 111 and cut with laser to obtain three pre-trimmed sheets of a size of 440×150 mm.

These three sheets were welded parallel to the pattern 120 corresponding to the optical encoder scale, and trimmed by laser cutting into a size of 440×440 mm, and fixing members were welded parallel to the pattern 120 thereby obtaining a flexible stamper 113 (122) as shown in FIGS. 19A and 19B, provided with the pattern 120 corresponding to the optical encoder scale, with the translucent area forming portions and light shield area forming portions (35.3 μm/35.3 μm) and a step difference of 17.6–37.6 μm.

Then the flexible stamper 113 (122) was mounted on a roller provided in advance with grooves substantially matching the fixing members, across a polyimide film of a size of 440×438 mm and a thickness of 100 μm, and the gap between the fixing members was filled with silicone resin as in the Embodiment 7 thereby obtaining a roller-shaped stamper 114 as shown in FIG. 19A, wherein the extrusion molding was conducted in a direction a shown in FIG. 19B, as the translucent area forming portions and the light shield area forming portions were arranged perpendicularly to the molding direction.

The above-mentioned roller-shaped stamper 114 was mounted on an apparatus shown in FIG. 24, and a continuous optical scale sheet of a thickness of 0.3 mm and a width of 520 mm was produced by extruding molten amorphous olefin resin (trade name Zeonex 250; manufactured by Nippon Zeon Co.) from a T-die 116 of an extruder 118 at a resin temperature of 280° C.–340° C. and passing the resin between the roller-shaped stamper 114 and a mirror-finish roller 115, with a pressure of 2000 kgf therebetween.

The molding operation was conducted continuously for 4 hours under the conditions of a T-die temperature of 330° C., a stamper surface temperature of 145° C., a resin sheet speed of 4 m/min. and a resin extrusion rate of 14.5 kg/hr.

The optical scales thus obtained were inspected for the bubble defects, in three locations of 4×4 mm each in each scale pattern, but the detected defects were 10 or less and scarcely affected the performance of the optical scales. Also the precision of transfer was at least 95%, and thus the optical scales of a very high quality could be produced in a large amount within a short time.

[Embodiment 9]

At first, as shown in FIG. 22A, trapezoidal grooves of a depth of 150 μm and a width of 8 mm were formed as sliding face forming portions 103, on the surface of a phosphor bronze substrate 105 of 450×200×80 mm, thereby obtaining 11 pattern forming portions 104 corresponding to the optical scale of a width of 2 mm, with a pitch of 10 mm. Said sliding face forming portions 103 were formed with a sintered diamond bite, on a mirror-finished phosphor bronze substrate 105 mounted on a cutting machine.

Then a monocrystalline diamond bite C 126 shown in FIG. 29 was employed for forming translucent area forming portions 101 and light shield area forming portions 102, in the pattern forming portion 104 corresponding to the optical scale, as shown in FIG. 22A. After the sintered diamond bite was replaced by the monocrystalline diamond bite C, the cutting direction was changed by 90° to cut the translucent area forming portions 101 perpendicularly to the pattern forming portions 104. In order to form the light shield area forming portion 102 into a tetragonal cone, there were cut 4700 lines with a cutting depth of 150 μm and a pitch of 70.6 μm. The monocrystalline diamond bite C had a complex shape as shown in FIG. 29, but the edge portion 127 may be somewhat rounded, and the tip end portion may also be rounded in some cases.

After the cutting operation, rinsing was conducted, and hard nickel plating for anticorrosion and surface hardening was applied with a thickness of 1000 Å, thereby obtaining a phosphor bronze master (father stamper) 107.

Then three glass masters 111 were prepared in the same manner as in the Embodiment 7, subsequently the process was conducted to the polishing step, and the conductive film 109 and the metal film 112 were integrally peeled off from the glass masters 111 and cut with laser to obtain three pre-trimmed sheets of a size of 440×150 mm.

These three sheets were welded parallel to the pattern 120 corresponding to the optical encoder scale, and trimmed by laser cutting into a size of 440×440 mm, and fixing members were welded parallel to the pattern 120 thereby obtaining a flexible stamper 113 (122) as shown in FIGS. 19A and 20, provided with the pattern 120 corresponding to the optical encoder scale, with the translucent area forming portions and light shield area forming portions (35.3 µm/35.3 µm) and a step difference of 150 µm.

Then the above-mentioned flexible stamper 113 (122) was mounted on a roller provided in advance with grooves substantially matching the fixing members, across a polyimide film of a size of 440×438 mm and a thickness of 100 µm, and the gap between the fixing members was filled with silicone resin as in the Embodiment 7 thereby obtaining a roller-shaped stamper 114 as shown in FIG. 19A, wherein the extrusion molding was conducted in a direction a shown in FIG. 20, as the translucent area forming portions and the light shield area forming portions were arranged perpendicularly to the molding direction.

The above-mentioned roller-shaped stamper 114 was mounted on an apparatus shown in FIG. 24, and a continuous optical scale sheet 117 of a thickness of 0.3 mm and a width of 520 mm was produced by extruding molten amorphous polyolefin resin (trade name Zeonex 250; manufactured by Nippon Zeon Co.) from the T-die 116 of the extruder 118 at a resin temperature of 280° C.–340° C. and passing the resin between the roller-shaped stamper and the mirror-finish roller 115, with a pressure of 2000 kgf therebetween.

The molding operation was conducted continuously for 4 hours under the conditions of a T-die temperature of 330° C., a stamper surface temperature of 145° C., a resin sheet speed of 4 m/min., and a resin extrusion rate of 14.5 kg/hr.

The optical scales thus obtained were inspected for the bubble defects, in three locations of 4×4 mm each in each scale pattern, but the detected defects were 10 or less and scarcely affected the performance of the optical scales. Also the precision of transfer was at least 95%, and thus the optical scales of a very high quality could be produced in a large amount within a short time.

[Embodiment 10]

At first, as shown in FIG. 25A, grooves of a depth of 60 µm and a width of 6 mm were formed as sliding face forming portions 103, on the surface of a phosphor bronze substrate 105 of 450×200×80 mm, thereby obtaining 4 pattern forming portions 104 corresponding to the optical scale of a width of 4 mm, with a pitch of 10 mm. Said sliding face forming portions 103 were formed with a sintered diamond bite, on a mirror-finished phosphor bronze substrate 105 mounted on a cutting machine.

Then a monocrystalline diamond bite A 126 was employed for forming translucent area forming portions 101 and light shield area forming portions 102, in the pattern forming portions 104 corresponding to the optical scales.

After the sintered diamond bite was replaced by the monocrystalline diamond bite A, the cutting direction was changed by 90° to cut the translucent area forming portions 101 in staggered pattern, perpendicularly to the pattern forming portion 104 corresponding to the optical scale. It is also possible to re-mount the phosphor bronze substrate, with a change of angle by 90°, on the cutting machine. There were cut 4700 lines with a cutting depth of 35 µm and a pitch of 70.6 µm. The monocrystalline diamond bite A had a curved edge as shown in FIG. 27, and the stamper 122 with the air ejecting mechanism could be obtained by the combination of this curved edge and the staggered pattern cutting.

After the cutting operation, rinsing was conducted, and hard nickel plating for anticorrosion and surface hardening was applied with a thickness of 1000 Å, thereby obtaining a phosphor bronze master (faster stamper) with a staggered pattern.

Then a flexible stamper 113 (122) shown in FIG. 21 was obtained by welding fixing members parallel to the pattern 120, in a similar manner as in the Embodiment 8.

The flexible stamper shown in FIG. 21 had the translucent area forming portions and the light shield area forming portions (35.3 µm/35.3 µm), with a step difference of 22.6 µm.

Then the flexible stampers 113 (122) for the optical encoder scales were mounted on a roller provided in advance with grooves substantially matching the fixing members, across polyimide films of a size of 440×438 mm and a thickness of 100 µm, and the gap between the fixing members was filled with silicone resin to obtain a roller-shaped stamper 114 as shown in FIG. 19A. This roller-shaped stamper 114 is featured by facts that the translucent area forming portions and the light shield area forming portions are arranged perpendicularly to the molding direction, and that the patterns corresponding to the optical encoder scales mutually adjacent across the sliding face forming portion are mutually displaced by an odd multiple of a half of the pitch in a direction perpendicular to the molding direction.

The above-mentioned roller-shaped stamper 114 was mounted on an apparatus as shown in FIG. 24, and a continuous optical scale sheet 117 of a thickness of 0.3 mm and a width of 520 mm was produced in a similar manner as in the Embodiment 8. The optical scales thus obtained were inspected for the bubble defects in three locations of 4×4 mm each in each scale pattern, but the detected defects were 10 or less and scarcely affected the performance of the optical scales. Also the precision of transfer was at least 95%, and thus the optical scales of a very high quality could be produced in a large amount within a short time.

[Embodiment 11]

Now there will be explained, with reference to FIGS. 30A to 30D, the method for producing a roller-shaped stamper for an optical encoder scale, wherein the translucent area forming portions and the light shield area forming portions are respectively formed by a mirror finish surface and a coarse surface.

Figure 30A:
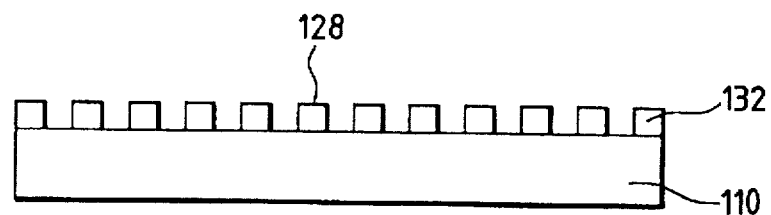
FIGS. 30A to 30D are views showing steps of a method for producing a roller-shaped stamper of an embodiment 11, for producing an optical encoder scale, provided with translucent area forming portions consisting of a mirror finish surface and light shielding area forming portions consisting of a coarse surface.

At first, as shown in FIG. 30A, a photoresist layer was formed on the surface of a glass substrate of 450×200×80 mm. The photoresist (AZ1350; manufactured by Hoechst Japan Co., Ltd.) was dropped onto the glass substrate, then coated to a thickness of 5000 Å with a spinner, and prebaked for 30 min. at 90° C.

It was then exposed to a predetermined (striped) pattern corresponding to the optical encoder scale with a laser exposure apparatus (trade name Mirror Projection Mask Aligner MPA-1500; manufactured by Canon Co.) and developed with developer (trade name AZ312MIF; manufactured by Hoechst Japan Co., Ltd.) to obtain a pattern 132 corresponding to the optical encoder scale.

A glass substrate 128 bearing a pattern as shown in FIGS. 30A and 31 was obtained through the above-mentioned steps.

Figure 30B:
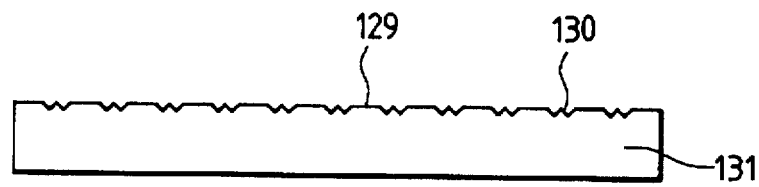

In a step shown in FIG. 30B, for forming the translucent area forming portions (mirror finish surface) and the light shield area forming portions (coarse surface), the exposured glass surface was etched by dry etching in a sputtering apparatus. The above-mentioned patterned glass substrate was mounted on the specimen stage of a sputtering apparatus (trade name SPF-530H; manufactured by Nichiden Anerva Co., Ltd.), then the chamber was evacuated to $4.0 \times 10^{-3}$ Pa and reverse sputtering was conducted for 10 minutes with an RF power of 1 kW and a substrate revolution of 10 rpm. Thus there was obtained a mother stamper 131 bearing mirror finish area forming portions 129 and coarse area forming portions 130.

Figure 30C:
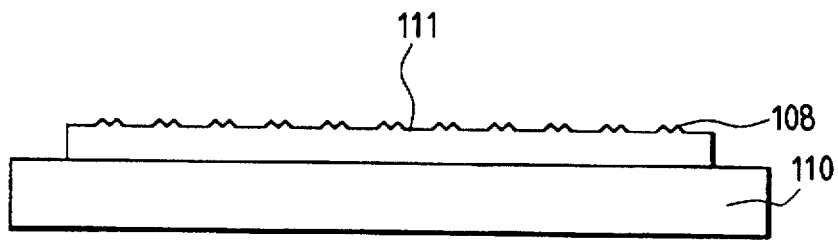
Figure 30D:
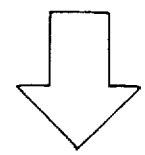
Figure 30D:

Then, in a step shown in FIG. 30C, a glass master 111, bearing a scale pattern 119 on a face of a glass substrate 110 of a size of 480×250×15 mm, was obtained by a process similar to that in the Embodiment 7.

Subsequently a conductive film forming step, a metal film forming step by electroplating, a polishing step and a peeling step were conducted as in the Embodiment 7, and a flexible stamper 113 (133) as shown in FIG. 32 was obtained by trimming into a size of 440×180 mm by laser cutting and welding of fixing members on the shorter sides at both ends. The flexible stamper 113 (133) is provided with 11 sets of 4700 cycles (corresponding to an optical encoder scale) of the coarse area forming portions 130 and the mirror finish area forming portions 129 with a pitch of 70.6 µm, for a width of 4 mm, parallel to the longer side of the stamper.

The above-mentioned flexible stampers for optical encoder scale were mounted on a roller provided in advance with grooves substantially matching the fixing members, across polyimide films of a size of 440×178 mm and a thickness of 100 µm, and the gap between the fixing members was filled with silicone resin in a similar manner as in the Embodiment 7 to obtain a roller-shaped stamper 114 as shown in FIG. 16A.

The roller-shaped stamper 114 was mounted on an apparatus as shown in FIG. 24, and a continuous optical scale sheet of a thickness of 0.4 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115, with a pressure of 2500 kgf therebetween.

The molding operation was continuously conducted for 4 hours under the conditions of a T-die temperature of 320° C., a stamper surface temperature of 145° C., a resin sheet speed of 5 m/min., and a resin extrusion rate of 36 kg/hr.

The optical scales thus obtained were inspected for the bubble defects in three locations of 4×4 mm each in each scale pattern, but the detected defects were 10 or less and scarcely affected the performance of the optical scales. Also the precision of transfer was at least 99%, and thus the optical scales of a very high quality could be obtained in a large amount within a short time.

[Embodiment 12]

In the following there will be explained, with reference to FIGS. 33A to 33D, the method for producing a roller-shaped stamper for the optical encoder scale, provided with the translucent area forming portions consisting of a mirror finish surface and the light shield area forming portions consisting of a coarse surface.

Figure 33A:
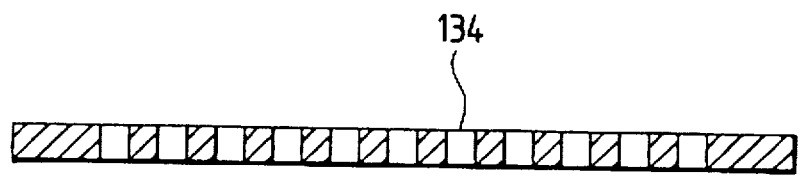
FIGS. 33A to 33D are views showing steps of a method for producing a roller-shaped stamper of an embodiment 12 for producing an optical encoder scale, provided with translucent area forming portions consisting of a mirror finish surface and light shielding area forming portions consisting of a coarse surface.
Figure 34:
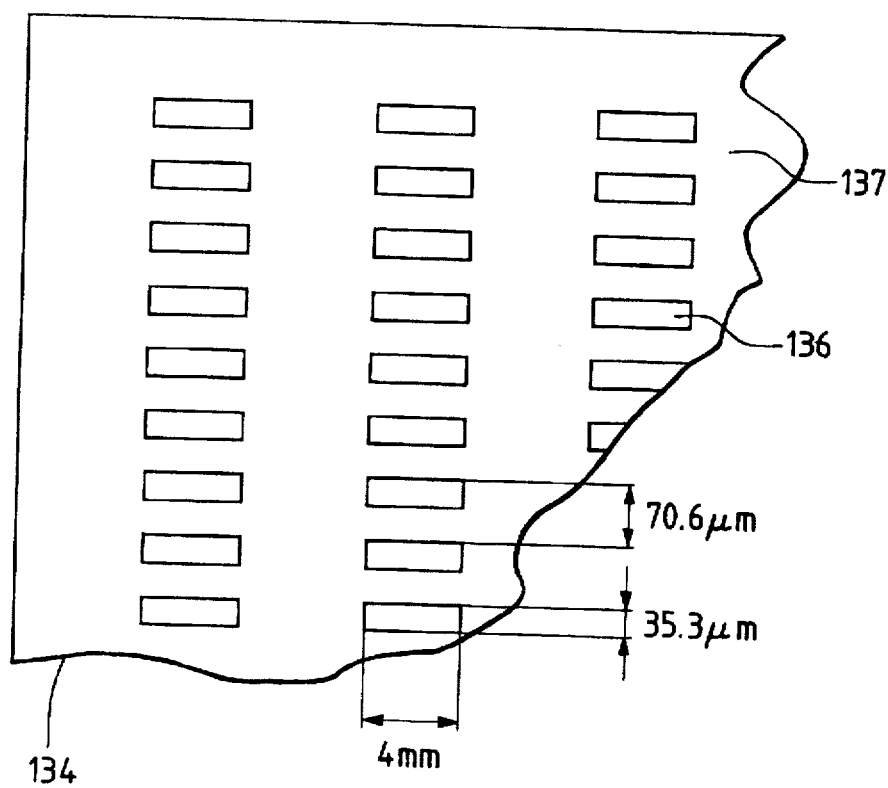
FIG. 34 is a schematic view of a mask member.

At first, as shown in FIG. 33A, slits 136 were formed according to a predetermined (striped) pattern of an optical encoder scale, in a metal plate 137 of 480×250×1 mm, to obtain a mask member 134 shown in FIG. 34.

The mask member 134 may be composed of any material enabling slit formation, such as glass or ceramics. In this embodiment there was employed a stainless steel plate 137, in which slits were formed by a YAG laser apparatus (trade name JK701; manufactured by Lumonics Co.).

Figure 33B:
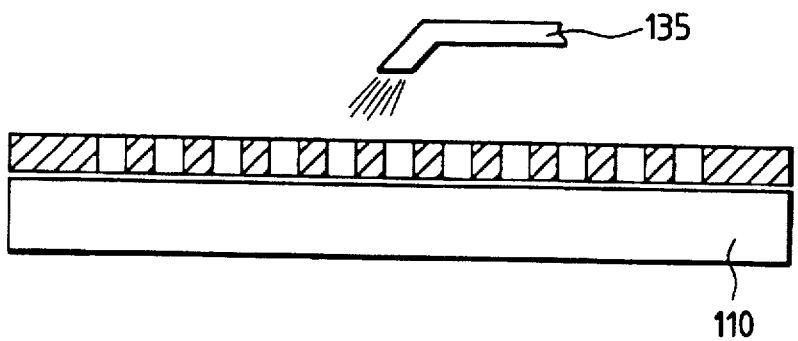

Then, in a step shown in FIG. 33B, for forming translucent area forming portions (mirror finish areas) and light shield area forming portions (coarse areas) on a glass substrate 110, the mask member 134 was placed and fixed thereon and a sludge-water mixture was emitted under a high pressure from a nozzle 135 of a sand blaster to etch the exposed glass surface.

Figure 33C:
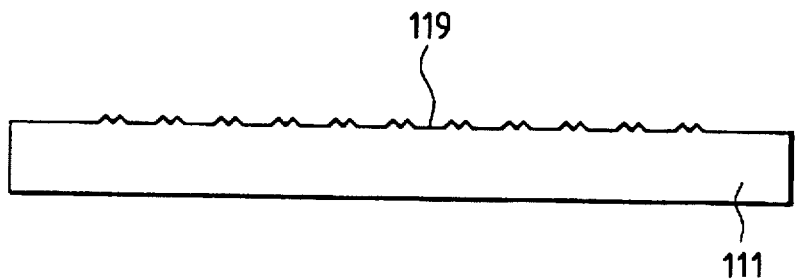
Figure 33D:
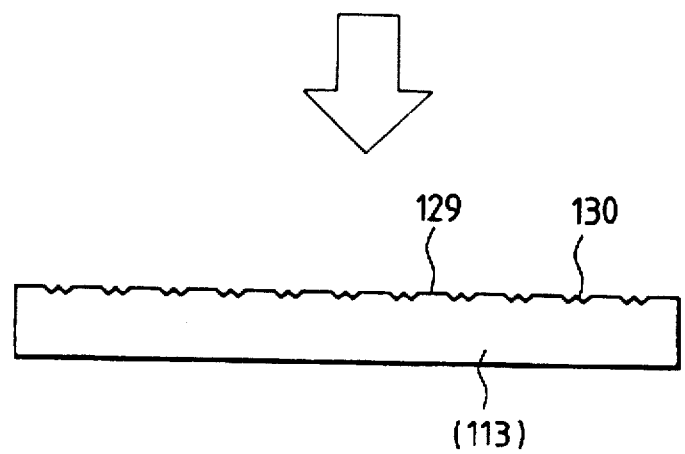

After the etching operation, in a step shown in FIG. 33C, the glass substrate 110 was rinsed and dried to obtain a glass master 111 bearing a scale pattern 119.

Subsequently a conductive film forming step, a metal film forming step by electroplating, a polishing step and a peeling step were conducted as in the Embodiment 7, and a flexible stamper 113 (138) as shown in FIG. 35 was obtained by trimming into a size of 440 ×180 mm by laser cutting and welding of fixing members on the shorter sides at both ends. The flexible stamper 113 (138) was provided with 11 sets of 4700 cycles (corresponding to an optical encoder scale) of the coarse area forming portions 130 and the mirror finish area forming portions 129 with a pitch of 70.6 µm and with a width of 4 mm, parallel to the longer sides of the stamper.

The above-mentioned flexible stampers for optical encoder scale were mounted on a roller provided in advance with grooves substantially matching the fixing members, across polyimide films of a size of 440×178 mm and a thickness of 100 µm, and the gap between the fixing members was filled with silicone resin in a similar manner as in the Embodiment 7 to obtain a roller-shaped stamper 114 as shown in FIG. 16A.

The roller-shaped stamper 114 was mounted on an apparatus as shown in FIG. 24, and a continuous optical scale sheet of a thickness of 0.3 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115, with a pressure of 2500 kgf therebetween.

The molding operation was continuously conducted for 4 hours under the conditions of a T-die temperature of 320° C., a stamper surface temperature of 145° C., a resin sheet speed of 5 m/min. and a resin extrusion rate of 27 kg/hr.

The optical scales thus obtained were inspected for the bubble defects in three locations of 4×4 mm each in each scale pattern, but the detected defects were 10 or less and scarcely affected the performance of the optical scales. Also the precision of transfer was 99% or higher, and thus the optical scales of a very high quality could be obtained in a large amount within a short time.

[Embodiment 13]

In the following there will be explained, with reference to FIGS. 36A to 36C, the method for producing a roller-shaped stamper for the optical encoder scale, provided with the translucent area forming portions consisting of a mirror finish surface and the light shield area forming portions consisting of a coarse surface.

At first, as shown in FIG. 36A, a photoresist layer was formed on a coarse surface of a metal plate 139 of a size of 480×250 mm and a thickness of 300 μm. The surface coarseness of the coarse surface is 1–100 μm, preferably 10–50 μm. In the present embodiment there was employed a metal plate 139 with a coarse surface of a surface coarseness of 20 μm. The photoresist (AZ1350; manufactured by Hoechst Japan Co., Ltd.) was dropped onto the metal plate 139 with a coarse surface, then coated to a thickness of 5 μm with a spinner, and prebaked for 30 min. at 90° C.

It was then exposed to a predetermined (striped) pattern corresponding to the optical encoder scale with a laser exposure apparatus (trade name Mirror Projection Mask Aligner MPA-1500; manufactured by Canon Co.) and developed with developer (trade name AZ312MIF; manufactured by Hoechst Japan Co., Ltd.) to obtain a pattern 132 corresponding to the optical encoder scale.

Then, in a step shown in FIG. 36B, the exposed coarse surface of the metal plate 139 bearing the pattern 132 is planarized to mirror finish. More specifically, the ultraviolet curable resin 8 employed in the Embodiment 7 was dropped onto the coarse-surfaced metal plate 139 bearing the pattern 132, and was coated to a thickness of 3 μm by a spinner (3 μm from the peaks of the surface irregularity). The metal plate 139 thus processed was placed in a vacuum chamber which was evacuated to a predetermined low pressure, and the resin was cured by ultraviolet irradiation from a metal halide lamp (trade name UVC-2533; manufactured by Ushio Denki Co., Ltd.) with an intensity of 160 W/cm$^2$ and a lamp distance of 130 mm.

In a step shown in FIG. 36C, the pattern 132 was removed by immersion in solvent (acetone) and rinsing with deionized water. Then sliding face forming portions 103 were formed by cutting grooves of a depth of 50 μm and a width of 6 mm with a sintered diamond bite as in the Embodiment 1, in the gaps between the pattern forming portions 104 corresponding to the optical scales, and a flexible stamper 113 (138) provided with sliding face forming portions as shown in FIG. 37 was obtained by trimming into a size of 440×180 mm by laser cutting and welding the fixing members on the shorter sides on both ends. This flexible stamper 113 (138) was provided with 11 sets of 4700 cycles (corresponding to an optical encoder scale) of the coarse area forming portions 130 and the mirror finish area forming portions 129 with a pitch of 70.6 μm and with a width of 4 mm, parallel to the longer sides of the stamper.

The above-mentioned flexible stampers for optical encoder scale were mounted on a roller provided in advance with grooves substantially matching the fixing members, across polyimide films of a size of 440×178 mm and a thickness of 100 μm, and the gap between the fixing members was filled with silicone resin in a similar manner as in the Embodiment 7 to obtain a roller-shaped stamper 114 as shown in FIG. 16A.

The roller-shaped stamper 114 was mounted on an apparatus as shown in FIG. 24, and a continuous optical scale sheet of a thickness of 0.3 mm and a width of 250 mm was produced by extruding molten bisphenol-A polycarbonate resin (trade name H-300R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115, with a pressure of 2500 kgf therebetween.

The molding operation was conducted continuously for 4 hours under the conditions of a T-die temperature of 320° C., a stamper surface temperature of 145° C., a resin sheet speed of 5 m/min. and a resin extrusion rate of 27 kg/hr.

The optical scales thus obtained were inspected for the bubble defects in three locations of 4×4 mm each in each scale pattern, but the detected defects were 10 or less and scarcely affected the performance of the optical scales. Also the precision of transfer was 99% or higher, and thus the optical scales of a very high quality could be obtained in a large amount within a short time.

[Embodiment 14]

In the following there will be explained, with reference to FIGS. 38A to 38C, the method for producing a roller-shaped stamper for the optical encoder scale, provided with the translucent area forming portions consisting of a mirror finish surface and the light shield area forming portions consisting of a coarse surface.

At first, as shown in FIG. 38A, a photoresist layer was formed on a mirror finish surface of a metal plate 140 of a size of 480 mm×250 mm×250 μm. The surface coarseness of the mirror finish surface is 0–10 μm, preferably 0–5 μm. In the present embodiment, there was employed a metal plate 140 with a mirror finish surface of a surface coarseness of 2 μm, composed of highly pure nickel. The photoresist (AZ1350; manufactured by Hoechst Japan Co., Ltd.) was dropped onto the mirror finished metal plate 140, then coated to a thickness of 5000 Å with a spinner, and prebaked for 30 min. at 90° C.

It was then exposed to a predetermined pattern corresponding to the optical encoder scale with a laser exposure apparatus (trade name Mirror Projection Mask Aligner MPA-1500; manufactured by Canon Co.) and developed with developer (trade name AZ312MIF; manufactured by Hoechst Japan Co., Ltd.) to obtain a pattern 132 corresponding to the optical encoder scale.

Then, in a step shown in FIG. 38B, the exposed mirror finish surface of the metal plate 140 bearing the pattern 132 was made coarse. More specifically, the mirror-finished metal plate 140 bearing the pattern 132 was mounted on the specimen stage of a sputtering apparatus (trade name SPF-530H; manufactured by Nichiden Anerva Co., Ltd.), then the chamber was evacuated to 4.0×10$^{-3}$ Pa, and reverse sputtering was conducted for 10 minutes with an RF power of 1 kW and a substrate revolution of 10 rpm. The mirror finish area forming portions 129 and the coarse area forming portions 130 were formed by these steps.

In a step shown in FIG. 38C, the pattern 132 was removed by immersion in solvent (acetone) and rinsing with deionized water. Then sliding face forming portions 103 were formed by cutting grooves of a depth of 50 μm and a width of 6 mm with a sintered diamond bite as in the Embodiment 1, in the gaps between the pattern forming portions 104 corresponding to the optical scales. Then a flexible stamper 113 (133) provided with sliding face forming portions as shown in FIG. 39 was obtained by trimming into a size of 440×180 mm by laser cutting and by welding the fixing members on the shorter sides on both ends. This flexible stamper 113 (133) was provided with 11 sets of 4700 cycles (corresponding to an optical encoder scale) of the coarse area forming portions 130 and the mirror finish area forming portions 129 with a pitch of 70.6 μm and with a width of 4 mm, parallel to the longer sides of the stamper.

The above-mentioned flexible stampers for optical encoder scale were mounted on a roller provided in advance with grooves substantially matching the fixing members, across polyimide films of a size of 440×178 mm and a thickness of 100 μm, and the gap between the fixing members was filled with silicone resin in a similar manner as in the Embodiment 7 to obtain a roller-shaped stamper 114 as shown in FIG. 16A.

The roller-shaped stamper 114 was mounted on an apparatus as shown in FIG. 24, and a continuous optical scale sheet of a thickness of 0.3 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115, with a pressure of 2500 kgf therebetween.

The molding was conducted under the same conditions and time as those in the Embodiment 13. The obtained optical scales were evaluated in the same manner as in the Embodiment 13, but the detected defects were 10 or less and scarcely affected the performance of the optical scales. Also the precision of transfer was 99% or higher, and the satisfactory optical scales could be produced in a large amount within a short time.

[Embodiment 15]

In the following there will be explained, with reference to FIGS. 40A to 40C the method for producing a directly cut roller-shaped stamper for the optical encoder scale, provided with the translucent area forming portions consisting of a mirror finish surface and the light shield area forming portions consisting of a coarse surface.

On a metal plate 137 of 942×200×1 mm, slits 136 (4 mm×35.3 μm each) of a predetermined pattern of the optical encoder scale were formed along the entire longer side in four lines, thereby obtaining a mask member 134 as shown in FIG. 34.

The mask member 134 can be composed of any material that accepts slit formation, for example a polyimide film. In the present embodiment there was employed a stainless steel plate 137 on which the slits 136 were formed by a carbon dioxide gas laser.

Then, as shown in FIG. 40A, the mask member 134 was wound around a mirror finish roller 115 and was fixed with an adhesive tape and instant adhesive. Attention was paid in fixing so as to maintain the mask member 134 in close contact with the mirror finish roller 115, thereby not exposing the mirror finish surface of the roller 115 except in the slit 136. The mirror finish roller 115, having a cylindrical form of a diameter of 300 mm and a length of 500 mm, was composed of carbon steel, bearing a mirror finish chromium film on the molding surface.

Then, in a step shown in FIG. 40B, for forming the translucent area forming portions (mirror finish surface) and the light shield area forming portions (coarse surface), the mirror finish surface (molding surface) of the roller 115 was etched. More specifically, as shown in FIG. 40B, the exposed mirror finish surface was etched by emitting a sludge-water mixture under a high pressure from a nozzle 135 of a sand blaster while the mirror finish roller 115 bearing the mask member 134 thereon was rotated in a direction a with a revolution of 5 to 10 rpm, thereby forming coarse area forming portions 130. The particle size of the sludge was so selected that the coarse area forming portions 130 had a surface coarseness of 50 μm.

Finally the mask member 134 was removed from the mirror finish roller 115, which was subsequently subjected to rinsing with deionized water and air blowing, whereby provided was a directly cut roller-shaped stamper 141 shown in FIG. 40C, in which the mirror finish area forming portions and the coarse area forming portions were alternately arranged. On the stamper 141, the coarse area forming portions 130 and the mirror finish area forming portions 129 of a width of 4 mm are continuously arranged, with a pitch of 70.6 μm, in the extruding direction (transport direction of the continuous optical scale sheet).

The above-mentioned directly cut roller-shaped stamper 141 was mounted on an apparatus as shown in FIG. 24, and a continuous optical scale sheet of a thickness of 0.3 mm and a width of 250 mm was produced by extruding molten bisphenol-A polycarbonate resin (trade name H-3000R; manufactured by Mitsubishi Gas Chemical Co., Ltd.) at a resin temperature of 280° C.–340° C. and passing the resin between the directly cut roller-shaped stamper 141 and the mirror finish roller 115 with a pressure of 2500 kgf therebetween.

The molding was conducted under the same conditions and time as those in the Embodiment 13. The obtained optical scales were evaluated in the same manner as in the Embodiment 13, but the detected defects were 10 or less and scarcely affected the performance of the optical scales. The precision of transfer was 99% or higher, and thus the satisfactory optical scales could be produced in a large amount within a short time. In contrast to the roller-shaped stampers 114 in the foregoing Embodiments 7 to 14 and 17, the directly cut roller-shaped stamper 141 bears the pattern 120, corresponding to the optical scale, continuously in the extruding direction or the transport direction of the continuous optical scale sheet, so that, on the continuous optical scale sheet 117 produced in the present embodiment, the transferred pattern of the optical scale was also continuous. Consequently the optical scale prepared by the directly cut roller-shaped stamper 141 had the advantage of being adaptable to any size.

[Embodiment 16]

In the following there will be explained, with reference to FIGS. 41A and 41B, the method of producing a directly cut roller-shaped stamper for an optical encoder scale, provided with the translucent area forming portions and the light shield area forming portions.

At first, as shown in FIG. 41A, on a cylindrical roller 143 of a diameter 300 mm and a length of 500 mm, there were formed five pattern forming portions 104, each corresponding to an optical scale of a width of 4 mm, by cutting grooves of a depth of 60 μm and a width of 6 mm as sliding face forming portions 103, on the mirror finish surface of the roller 143 for direct cutting. The above-mentioned sliding face forming portions 103 were formed with a sintered diamond bite on the roller 143, subjected in advance to mirror finishing and mounted on a cutting machine.

The grooves constituting the sliding face forming portions 103 were formed parallel to the extruding direction (transport direction of the continuous optical scale sheet). The roller 143 for direct cutting was composed of phosphor bronze, which was successfully employed in the preparation of the phosphor bronze master in the Embodiment 7. However the material is not limited to phosphor bronze but can be any material accepting cutting with the diamond bite, for example carbon steel.

Then, as shown in FIG. 41B, a monocrystalline diamond bite A 106 shown in FIG. 27 was employed to form translucent area forming portions 101 and light shield area forming portions 102 in the pattern forming portion 104 corresponding to the optical scale.

More specifically, after the sintered diamond bite was replaced by the monocrystalline diamond bite A, the cutting direction was changed by 90° to cut the translucent area forming portions 101 perpendicularly to the pattern forming portion 104 corresponding to the optical scale.

Thus the line cutting operation was conducted on the entire mirror finish surface of the roller 143 with a cutting depth of 35 μm and a pitch of 70.6 μm. Subsequently conducted were rinsing with solvent, rinsing with deionized water and air blowing, and hard nickel plating was applied with a thickness of 500–1000 Å for anticorrosion and surface hardening, thereby obtaining a directly cut roller-shaped stamper 142 on which the translucent area forming portions and the light shield area forming portions were alternately provided. On said stamper 142, the translucent area forming portions 101 and the light shield area forming portions 102 of a width of 4 mm were continuously arranged, with a pitch of 70.6 μm, along the extruding direction (transport direction of the continuous optical scale sheet).

The above-mentioned directly cut roller-shaped stamper 142 was mounted on an apparatus as shown in FIG. 24, and a continuous optical scale sheet 117 of a thickness of 0.3 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 with a resin temperature of 280° C.–340° C. and passing the resin between the directly cut roller-shaped stamper 142 and a mirror finish roller 115, with a pressure of 2500 kgf therebetween.

The molding was conducted under the same conditions and time as those in the Embodiment 13. Also the obtained optical scales were evaluated in the same manner as in the Embodiment 13, but the detected defects were 10 or less and scarcely affected the performance of the optical scales. Also the precision of transfer was 99% or higher, and thus the satisfactory optical scales could be produced in a large amount within a short time.

In contrast to the roller-shaped stampers 114 in the foregoing embodiments 7 to 14 and 17, the directly cut roller-shaped stamper 141 bears the pattern 120, corresponding to the optical scale, continuously in the extruding direction or the transport direction of the continuous optical scale sheet, so that, on the continuous optical scale sheet 117 produced in the present embodiment, the transferred pattern of the optical scale was also continuous. Consequently the optical scale prepared by the directly cut roller-shaped stamper 142 had the advantage of being adaptable to any size.

[Embodiment 17]

In the following there will be explained, with reference to FIGS. 42A to 42C, the method of producing a roller-shaped stamper for the optical encoder scale, provided with the translucent area forming portions consisting of a mirror finish surface and the light shield area forming portions consisting of a coarse surface.

At first, as shown in FIG. 42A, a photoresist layer was formed on a metal plate 139 of 480 mm×250 mm×300 μm having a coarse surface. The surface coarseness of the coarse surface is 1–100 μm, preferably 10–50 μm. The photoresist (trade name AZ1370; manufactured by Hoechst Japan Co., Ltd.) was dropped onto the metal plate 139 having the coarse surface, then coated into a thickness of 10 μm by a spinner, and prebaked for 30 min. at 90° C.

It was then exposed to a predetermined pattern of the optical encoder scale by a laser exposure apparatus (trade name Mirror Projection Mask Aligner MPA-1500; manufactured by Canon Co.) and developed with developer (trade name AZ312MIF; manufactured by Hoechst Japan Co., Ltd.) to obtain a pattern 132 of the optical encoder scale.

Then, in a step shown in FIG. 42B, the exposed coarse surface of the metal pattern 132 of the pattern 132 thereon was etched to form recesses 144, which were then planarized to a mirror finish surface. More specifically, the coarse-surfaced metal plate 139 bearing the pattern 132 was mounted on a specimen stage of an ion milling apparatus, and, after the chamber was evacuated, the milling was conducted for 8 hours under the conditions of an Ar gas pressure of $1.1 \times 10^{-4}$ Torr, a chiller set temperature of 10° C., an INO source output of 1 kV (200 mA), a specimen stage angle of 90° and a specimen stage revolution of 10 rpm, thereby forming the recesses 144 of a depth of 10 μm or larger.

Then the ultraviolet curable resin 108 employed in the Embodiment 7 was dropped on the coarse-surfaced metal plate 139 bearing thus formed recesses 144 and was coated by a spinner into a thickness of 2 μm, from the top of the peaks at the bottoms of the recesses 144.

The ultraviolet curable resin 108 for planarizing the bottoms of the recesses 144 may have an arbitrary thickness, but the bottoms of the recesses 144 have to be entirely covered by the ultraviolet curable resin 108 as shown in FIG. 42B when it is cured.

The coarse-surfaced metal plate 139 thus processed was set in a vacuum chamber, and, after it was evacuated to a predetermined level, the resin was cured by ultraviolet irradiation with a metal halide lamp (trade name UVC-2533; manufactured by Ushio Denki Co., Ltd.) with a power of 160 W/cm and a lamp distance of 130 mm.

In a step shown in FIG. 42C, the pattern 132 was removed by immersion in acetone followed by rinsing with deionized water. Then the plate was trimmed into a size of 440×180 mm by laser cutting and the fixing members were welded to the shorter sides on both ends, whereby obtained was a flexible stamper 113 (145) in which the coarse area forming portions were higher than the mirror finish area forming portions.

The above-mentioned flexible stamper 113 (145) with the coarse area forming portions higher than the mirror finish area forming portions has a structure as shown in FIG. 35, when seen from the side of the molding face, wherein provided were 11 sets of 4700 cycles (corresponding to an optical encoder scale) of the coarse area forming portions 130 and the mirror finish forming portions 129 with a pitch of 70.6 μm, along the longer sides of the stamper.

The above-mentioned flexible stampers 113 (145) for the optical encoder scales were mounted on a roller provided in advance with grooves substantially matching the fixing members, across polyimide films of a size of 440×178 mm and a thickness of 100 μm, and the gap between the fixing members was filled with silicone resin as in the Embodiment 1 to obtain a roller-shaped stamper 114 as shown in FIG. 16A.

The above-mentioned roller-shaped stamper 114 was mounted on an apparatus as shown in FIG. 24, and a continuous optical scale sheet 117 of a thickness of 0.3 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115 with a pressure of 2500 kgf therebetween.

The molding operation was conducted continuously for 4 hours under the conditions of a T-die temperature of 320° C., a stamper surface temperature 145° C., a resin sheet speed of 5 m/min., and a resin extrusion rate of 27 kg/hr.

The optical scales thus produced were inspected for the bubble defects in three locations of 4×4 mm each in each scale pattern, but the detected defects were 10 or less and scarcely affected the performance of the optical scales. Also the precision of transfer was 99% or higher, and thus satisfactory optical scales could be produced in a large amount within a short time.

[Embodiment 18]

The flexible stampers 113 (145) of the Embodiment 17 were mounted on a roller provided in advance with grooves substantially matching the fixing members, across polyimide films of a size of 440×178 mm and a thickness of 100 μm, and the gap between the fixing members was filled with silicone resin as in the Embodiment 7 to obtain a roller-shaped stamper as shown in FIG. 7.

The above-mentioned roller-shaped stamper 114 was mounted on an apparatus as shown in FIG. 24, and a continuous optical scale sheet 117 of a thickness of 0.3 mm and a width of 250 mm was produced by extruding molten bisphenol-A polycarbonate resin (trade name H-3000R; manufactured by Mitsubishi Gas Chemical Co., Ltd.) from a T-die 116 of an extruder 118 at a resin temperature of 280° C.–340° C. and passing the resin between the roller-shaped stamper 114 and a mirror finish roller 115 with a pressure of 2500 kgf therebetween, whereby the film 117 was extracted from a drawing device consisting of the roller-shaped stamper 114 and the mirror finish roller 115.

Then, as shown in FIG. 43, the transported continuous optical scale sheet was pinched between an ink supply roller 146 and an auxiliary roller 148, thereby applying a thin layer 150 of ink over the entire transfer surface of the continuous optical scale sheet 117. The continuous optical scale sheet 117 bearing the applied ink 150 thereon proceeded in a direction a, and again pinched between an ink removing roller 147 and an auxiliary roller B 149 whereby the ink 150 is removed only in the unnecessary portions. For this operation there was employed black ink for printing.

As the flexible stamper 113 (145) employed in the present embodiment had the coarse area forming portions higher than the mirror finish area forming portions, the coarse areas on the continuous optical scale sheet 117 become lower than the mirror finish areas. Consequently, as shown in FIG. 44A, the ink 150 is removed in the mirror finish areas (translucent areas) and remains only in the coarse areas (light shield areas).

Finally the sheet was passed by a hot air dryer 156 to dry the ink 150 formed only in the coarse areas (light shield areas) thereby providing a continuous optical scale sheet 155 bearing ink thereon. The drying temperature was 60° C. in the present embodiment, but may be varied according to the transport speed and the molding conditions of the continuous optical scale sheet 117. The molding conditions were selected same as in the Embodiment 17.

The ink-bearing optical scales thus formed were inspected for the bubble defects and the ink smear defects in three locations of 4×4 mm each in each scale pattern, but the bubble defects were 10 or less and the ink smear defects were not observed.

Also the precision of transfer was 99% or higher, and the contrast between the translucent areas and the light shield areas was higher than that of the optical scales produced in the Embodiment 17. Thus optical scales of a very high quality could be produced in a large amount within a short time.

[Reference Example 3]

The flexible stampers 113 (138) of the Embodiment 13 were mounted on a roller provided in advance with grooves substantially matching the fixing members, across polyimide films of a size of 440×178 mm and a thickness of 100 μm and the gap between the fixing members was filled with silicone resin as in the Embodiment 7 to obtain a roller-shaped stamper 114 as shown in FIG. 16A.

The roller-shaped stamper 114 was mounted on an apparatus as shown in FIG. 24, and a continuous optical scale sheet 117 of a thickness of 0.3 mm and a width of 250 mm was produced by extruding the same resin under the same conditions as in the Embodiment 15, and was then pinched between an ink supply roller 146 and an auxiliary roller A 148 as in the Embodiment 18 whereby link 150 was thinly and uniformly applied on the entire transfer surface of the continuous sheet 117. The sheet 117 bearing the applied ink 150 thereon proceeded in a direction a and pinched again between an ink removing roller 147 and an auxiliary roller B 149 for reproving the ink only in the unnecessary areas.

As the flexible stamper 113 (145) employed in the present embodiment had the coarse area forming portions lower than the mirror finish area forming portions, the coarse areas in the continuous optical scale sheet 17 became higher than the mirror finish areas. Consequently, as shown in FIG. 44B, the ink 150 was removed in the coarse areas (light shield areas) and remain only in the mirror finish areas (translucent areas).

Finally the sheet was passed through a hot air dryer 156 to dry the ink 150 formed only in the mirror finish areas (translucent areas), thereby obtaining an ink-bearing continuous optical scale sheet. The drying temperature and the molding conditions were selected same as in the Embodiment 18.

The ink-bearing optical scales thus produced were inspected for the bubble defects and the ink smear defects, in three locations of 4×4 mm each in each scale pattern. The detected bubble defects were 10 or less and the precision of transfer was 99% or higher, but, because of the ink formation on the mirror finish areas (translucent areas) that should remain clear, the ink smear defects were observed over the entire surface. Thus there were produced defective products inadequate as the optical scales.

As will be apparent from the present example, as an essential condition for producing an ink-bearing optical scale, the light shield areas on the continuous optical scale sheet 117 have to be formed lower than the translucent areas.

[Embodiment 19]

A continuous optical scale sheet 117 of the present invention and an ink-bearing continuous optical scale sheet 155 were cut with a cutter and used for preparing a main scale 160 and a subscale 159 of an optical encoder.

Then, a light-emitting element 157, a photosensor element 159 and the subscale 159 were assembled as shown in FIG. 45, and the signal of the photosensor element 158 by photoelectric conversion of the light from the light-emitting element 157 was detected. As a result, there were obtained a peak amplitude of 1054 mV and an average of 608 mV. In the above-mentioned configuration, the sub scale 159 was prepared with the continuous optical scale sheet 117 of the Embodiment 7, and the main scale 160 was also prepared from the continuous sheet 117 of the Embodiment 7.

Then, for evaluating the molded products of other Embodiments, the main scale 160 was replaced by those prepared from the continuous optical scale sheets 117 of other Embodiments or that from the ink-bearing continuous optical scale sheet 155 while the sub scale 159 remained unchanged. As a result, for the main scales corresponding to all the foregoing Embodiments, there were obtained peak amplitudes of about 1000 mV and averages of about 600 mV, which corresponded to an improvement of 20% or higher in comparison with the conventional optical encoders.

The main scales of the conventional optical encoders have been prepared from a photographic film of for lithographic use, but they are associated with a limited optical transmittance in the translucent areas because of the presence of filler in the PET film, sub-coating layer, gelatin rear coating or emulsion layer constituting such photographic film. In contrast, -the main scales 160 employed in these comparisons are featured by a very high transmittance, which has presumably lead to the improvement, over 20%, of the signal characteristics.

Such high optical transmittance of the translucent areas allows to produce an inexpensive optical encoder of a high performance, since the light-emitting element or the photosensor element of a lower performance can be employed. Also the present invention relatively easily allows to reduce the pitch of the translucent areas/light shield areas, it is most adequate for information printing devices such as printers, for which finer resolution is required year after year.

[Reference Example 4]

As shown in FIG. 46, there were employed a main scale 161 prepared with a lithographic photographic film and a sub scale 159 prepared according to the Embodiment 19, in combination a light-emitting element 157 and a photosensor element 158. The electrical signal detected in the same manner as in the Embodiment 19 showed an amplitude peak of 800 mV and an average of 472 mV. As the only difference from the Embodiment 19 was in the main scale 161 prepared with the lithographic photographic film, the inferior signal characteristics can be ascribable to the filler contained in the constituents of the lithographic film.

The invention may be embodied in other specific forms without departing from the spirit or essential characteristics thereof. The foregoing embodiments are therefore to be considered in all respects as illustrative and not restrictive, the scope of the invention being indicated by the appended claims rather than by the foregoing description and all changes which come within the meaning and range of equivalence of the claims are therefore intended to be embraced therein.

What is claimed is:

1. A roller-shaped stamper for fabricating optical scales wherein light transmitting portions and light shielding portions are formed on an extruded thermoplastic resin by rotating said roller-shaped stamper and a molding roller disposed opposing to the roller-shaped stamper with the resin being disposed between said roller-shaped stamper and said molding roller, comprising:

a scale portion having light transmitting forming portions for forming said light transmitting portions on said resin, and light shielding forming portions for forming said light shielding portions on said resin, wherein said light transmitting forming portions and said light shielding forming portions are alternately arranged with a constant pitch in a direction of rotation of said roller-shaped stamper, and a plurality of said scale portions are arranged in a direction normal to said direction of rotation of said roller-shaped stamper; and a groove disposed between said plural scale portions and extending in said direction of rotation of said roller-shaped stamper to exhaust air between said thermoplastic resin and said roller-shaped stamper.

2. A roller-shaped stamper according to claim 1, wherein a depth of said groove is 5 to 100 μm.

3. A roller-shaped stamper according to claim 1, wherein a depth of said groove is 10 to 80 μm.

4. A roller-shaped stamper according to claim 1, wherein a width of said groove in a direction normal to said direction of rotation of said roller-shaped stamper is 0.1 to 10 mm.

5. A roller-shaped stamper according to claim 4, wherein a width of said groove is 0.3 to 8 mm.

6. A roller-shaped stamper according to claim 1, further comprising a groove provided on a boundary between said light transmitting forming portion and said light shielding forming portion.

7. A method for fabricating an optical scale having light transmitting portions and light shielding portions comprising the steps of:

disposing a roller-shaped stamper having light transmitting forming portions forming said light transmitting portions and light shielding forming portions forming said light shielding portions and a roller so that said roller-shaped stamper and said roller are mutually opposed, wherein said roller-shaped stamper has a scale portion wherein said light transmitting forming portions and said light shielding forming portions are alternately arranged with a constant pitch in a direction of rotation of said roller-shaped stamper and a plurality of said scale portions are arranged in a direction normal to said direction of rotation of said roller-shaped stamper and said plurality of said scale portions have a groove disposed between said plural scale portions and extending in said direction of rotation of said roller-shaped stamper; and rolling said roller-shaped stamper and said roller to extrude thermoplastic resin, exhausting air between said thermoplastic resin and said roller-shaped stamper through said groove to fabricate said optical scale.

8. A method according to claim 7, wherein a depth of said groove is 5 to 100 μm.

9. A method according to claim 7, wherein a depth of said groove is 10 to 80 μm.

10. A method according to claim 7, wherein a width of said groove in a direction normal to said direction of rotation of said roller-shaped stamper is 0.1 to 10 mm.

11. A method according to claim 10, wherein a width of said groove is 0.3 to 8 mm.

12. A method according to claim 7, wherein said roller-shaped stamper has a groove provided on a boundary between said light transmitting forming portion and said light shielding forming portion.

* * * * *

UNITED STATES PATENT AND TRADEMARK OFFICE
CERTIFICATE OF CORRECTION

PATENT NO. : 5,759,455
DATED : June 2, 1998
INVENTOR(S) : HIROFUMI KAMITAKAHARA, ET AL.

It is certified that error appears in the above-identified patent and that said Letters Patent is hereby corrected as shown below:

COLUMN 16

Line 44, "stamper" should read --stampers--.

COLUMN 31

Line 63, "132" (first occurrence) should read --139--.

COLUMN 33

Line 45, "same" should read --the same--.

COLUMN 34

Line 22, "same" should read --the same--; and
Line 64, "of for" should read --for--.

COLUMN 35

Line 2, "-the" should read --the--; and
Line 19, "combination" should read --combination of--.

Signed and Sealed this

Second Day of February, 1999

Attest:

*Acting Commissioner of Patents and Trademarks*

*Attesting Officer*